US 6,631,453 B1

(12) United States Patent
Friday

(10) Patent No.: US 6,631,453 B1
(45) Date of Patent: Oct. 7, 2003

(54) SECURE DATA STORAGE DEVICE

(75) Inventor: Victor Friday, Magnolia, TX (US)

(73) Assignee: Zecurity, Magnolia, TX (US)

( * ) Notice: Subject to any disclaimer, the term of this patent is extended or adjusted under 35 U.S.C. 154(b) by 0 days.

(21) Appl. No.: 09/996,550

(22) Filed: Nov. 27, 2001

Related U.S. Application Data

(60) Provisional application No. 60/269,019, filed on Feb. 14, 2001.

(51) Int. Cl.[7] .................................................. G06F 12/00
(52) U.S. Cl. ........................ 711/163; 711/152; 711/155; 711/164; 213/200; 213/201
(58) Field of Search .............................. 713/200, 201; 711/152, 155, 163, 164

(56) References Cited

U.S. PATENT DOCUMENTS

| | | | | |
|---|---|---|---|---|
| 5,889,942 | A | | 3/1999 | Orenshteyn ............... 713/201 |
| 5,963,642 | A | | 10/1999 | Goldstein ................. 702/138 |
| 6,012,145 | A | * | 1/2000 | Mathers et al. ............ 711/164 |
| 6,052,781 | A | * | 4/2000 | Weber .................... 713/100 |
| 6,065,120 | A | | 5/2000 | Laursen et al. ............ 713/201 |
| 6,081,900 | A | | 6/2000 | Subramanian et al. ...... 713/201 |
| 6,085,191 | A | | 7/2000 | Fisher et al. ............... 707/9 |
| 6,085,249 | A | | 7/2000 | Wang et al. ............... 709/229 |
| 6,122,741 | A | | 9/2000 | Patterson et al. .......... 713/200 |
| 6,145,006 | A | | 11/2000 | Vishlitsky et al. .......... 709/229 |
| 6,182,222 | B1 | | 1/2001 | Oparaji .................. 713/200 |
| 6,189,104 | B1 | | 2/2001 | Leppek .................. 713/201 |
| 6,275,939 | B1 | | 8/2001 | Garrison ................. 713/200 |
| 6,279,111 | B1 | * | 8/2001 | Jensenworth et al. ....... 713/159 |
| 6,289,462 | B1 | * | 9/2001 | McNabb et al. ........... 713/201 |

\* cited by examiner

*Primary Examiner*—T. V. Nguyen
(74) *Attorney, Agent, or Firm*—Mayer, Brown, Rowe & Maw LLP.

(57) ABSTRACT

A data storage/transmission hardware device (or multiple devices physically linked together) with two (or more) access channels is disclosed. One of the access channels allows for reading and writing of information (referred to as the "active channel") while the other access channel(s) (referred to as "passive channels") allow solely for the reading of information. The actual limitation of "write" access of the passive access channels is brought about by a combination of hardware and firmware. The information stored/or transmitted through the device may be (but is not limited to) data such as digital, graphical, image, multimedia, stream or any other type of computing information. This methodology spans multiple media and computing device types. This method can be physically implemented through the use of a shared media between the dynamic and passive channel(s) or it can be implemented with separate media for each primary/passive channel with added software/firmware that relays information from the primary channel media to the passive channel media.

29 Claims, 16 Drawing Sheets

FIG. 5

1 Authorization Table — 230

| External Connection | Slot Number | Command Set Name |
|---|---|---|
| ABC | 1 | ACTIVE |
| DEF | 2 | PASSIVE |

2 Command Configuration — 232

| Command Switch | Command | Allowed Indicator | |
|---|---|---|---|
| ACTIVE | WRITE | Y | |
| | ALTER | Y | |
| | DELETE | N | COULD BE Y |
| | FORMAT | Y | |
| | READ | Y | |
| PASSIVE | WRITE | N | |
| | ALTER | N | |
| | DELETE | N | |
| | FORMAT | N | |
| | READ | Y | |

3 Exception Configuration — 234
Reject all errors □ on
Allow read only on error □ off

LOGIC TRIAL SETS — 236

| EXT CONN ABC SLOT 1 | | EXT CONN DEF SLOT 2 | |
|---|---|---|---|
| FIRMWARE | | | |
| ABC - 1 | | RED | |
| DEF - 2 | | BLUE | |
| EXCEPTIONS | | REJECT | |

| PACKET NUMBER | EXT CONN | SLOT | COMMAND | RESULT |
|---|---|---|---|---|
| 1 | ABC | 1 | WRITE | OK |
| 2 | ABC | 2 | ANY | REJECT ERROR |
| 3 | DEF | 1 | ANY | REJECT ERROR |
| 4 | DEF | 2 | READ | OK |
| 5 | DEF | 2 | WRITE | REJECT ERROR |
| 6 | ABC | 1 | DELETE | REJECT ERROR |
| 7 | HIJ | 1 | WRITE | REJECT ERROR |
| 8 | LMN | 1 | READ | REJECT ERROR |

SECURE DATA STORAGE DEVICE

RELATED APPLICATIONS

This application claims priority from provisional application No. 60/269,019 filed Feb. 14, 2001.

FIELD OF INVENTION

This invention relates to secure storage devices for connected computers. More specifically, this invention relates to a secure storage device which allows one computer to read and write information on a common storage media while a second computer may only read the information from the common storage media.

BACKGROUND OF INVENTION

With the explosion of the Internet in commerce, security has become a great concern. The connection of computers to outside sources in order to provide information and data to the public or customers has created the risk that confidential information stored on these computers may be illegally or inadvertently accessed. Both, the inadvertent exposure of such information and the vulnerability of such computers to malicious harm through the rewriting or destruction of data are barriers to increased use of the Internet.

Thus, the computer industry is struggling with Internet security issues. Current industry solutions are inadequate because they are based on the premise that computer Internet security problems may be solved in the same manner as in the past. However, the current solutions such as firewalls, encryption, generated "keys", etc. do not solve core issues inherent to the Internet such as continuous connectivity, the software mandate, and the need for one-way data transmission.

Continuous connectivity is the ability to access computing systems via a constant connection from the outside to the particular computing network such as a World Wide Web connection. Continuous connectivity is a problem recreated and exacerbated by the Internet because this problem was once solved in the 1980s by elaborate internal security systems. These internal security systems (which are still in use today) were designed and constructed to control access to files, networks and databases through granted privileges and work effectively for those computing environments because access is controlled to the computing environments. Individual accountability is established when a user accesses the computing environment. However, the Internet, by design, has no central authority to determine individual authority and therefore individual accountability on the Internet is either not required or it may be effectively masked. Consequently, continuous connectivity has now resurfaced as a paramount security problem that must be addressed.

The software mandate is the current approach by security solution providers to use software to solve computing security for the Internet. There have also been some attempts to use hardware devices such as cards and keys as an alternative to security software. These solutions require customers to carry identity devices and/or require them to install extra hardware. These requirements prove to be cumbersome and present a marketing barrier for wide dissemination of such devices. Use of ACLs (access control lists), is currently the most common method of computer security. This requires building and maintaining the lists, which are vulnerable to the limitations inherent with ongoing changes in the environment, normal maintenance issues and human error.

Another mechanism which does not require individual hardware is the use of a firewall to control the flow of information and only allow data to flow out of the interface to the outside. The firewall is typically filtering software that validates data requests to a network. Again, firewalls require someone to program the firewall, which provides a point in the network that could be hacked by software tools.

The inability to establish individual accountability coupled with the need for continuous connectivity makes software alone insufficient to solve these issues. No firewall or encryption software is ever entirely capable of securing information because such software may eventually be circumvented by other software.

Thus, there exists a need for a one-way data transmission method controlled by hardware which makes it physically impossible to transmit data in the opposite direction. There is also a need for a data storage/transmission device for which data can be written from one computer and read from a separate computer. There is a further need for a data storage/transmission device which provides a non-physical continuous connection between two computers while maintaining data exchange. There is also a need for a data storage/transmission device where data may be distributed to multiple distributed computers at the same time. Additionally, there is a need for a data storage/transmission device which provides computing security in open computing environments, such as the World Wide Web or Internet. There is a need for a data storage/transmission device which enables secure Business-to-Business computing. Finally, there is a need for a device that can be deployed easily with a connection for Read/Write (R/W) operations and a separate connection for just Read Only (R/O) capabilities.

SUMMARY OF THE INVENTION

These needs may be addressed by the present invention, one aspect of which is a secure storage system for protecting data exchanged between a first and second computer. Both the computers are capable of requesting the reading of data and the writing of data. The secure storage system includes an active connector capable of receiving data or sending data, coupled to the first computer. A passive connector capable of receiving data or sending data is coupled to the second computer. A disk controller is coupled to the passive connector. A disk electronics unit is coupled to the disk controller. A storage media having stored data written from the first computer is coupled to the disk electronics unit. The storage media allows the second computer to read the stored data but prevents data received from the passive connector from being written.

Another aspect of the present invention is a method of making data from a first computer available to a second computer while preventing alteration of the data. The method includes establishing an active data connection to the first computer. A passive data connection is established for the second computer. Data on a storage device is written from the first computer. Requests for writing data from the second computer are examined and access to the storage device from the second computer is restricted by preventing writing data from the second computer to the storage device.

Another aspect of the present invention is a computing system for the secure exchange of data without data tampering. The system includes a first computing source having protectable data and an external data conduit. A second computing source is provided having an external data conduit. A secure storage device has an active connector and a passive connector. The active connector is coupled to the external data conduit of the first computing source and the passive connector is coupled to the external data conduit of the second computing source. The secure storage device includes a storage media which stores the protectable data and accepts writing of the protectable data from the first computing source and only reading of the protectable data by the second computing source.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

FIG. 5 is a diagram of the authorization and command tables used by the firmware for the data storage device in FIG. 2;

DESCRIPTION OF THE PREFERRED EMBODIMENT

Figure 1:
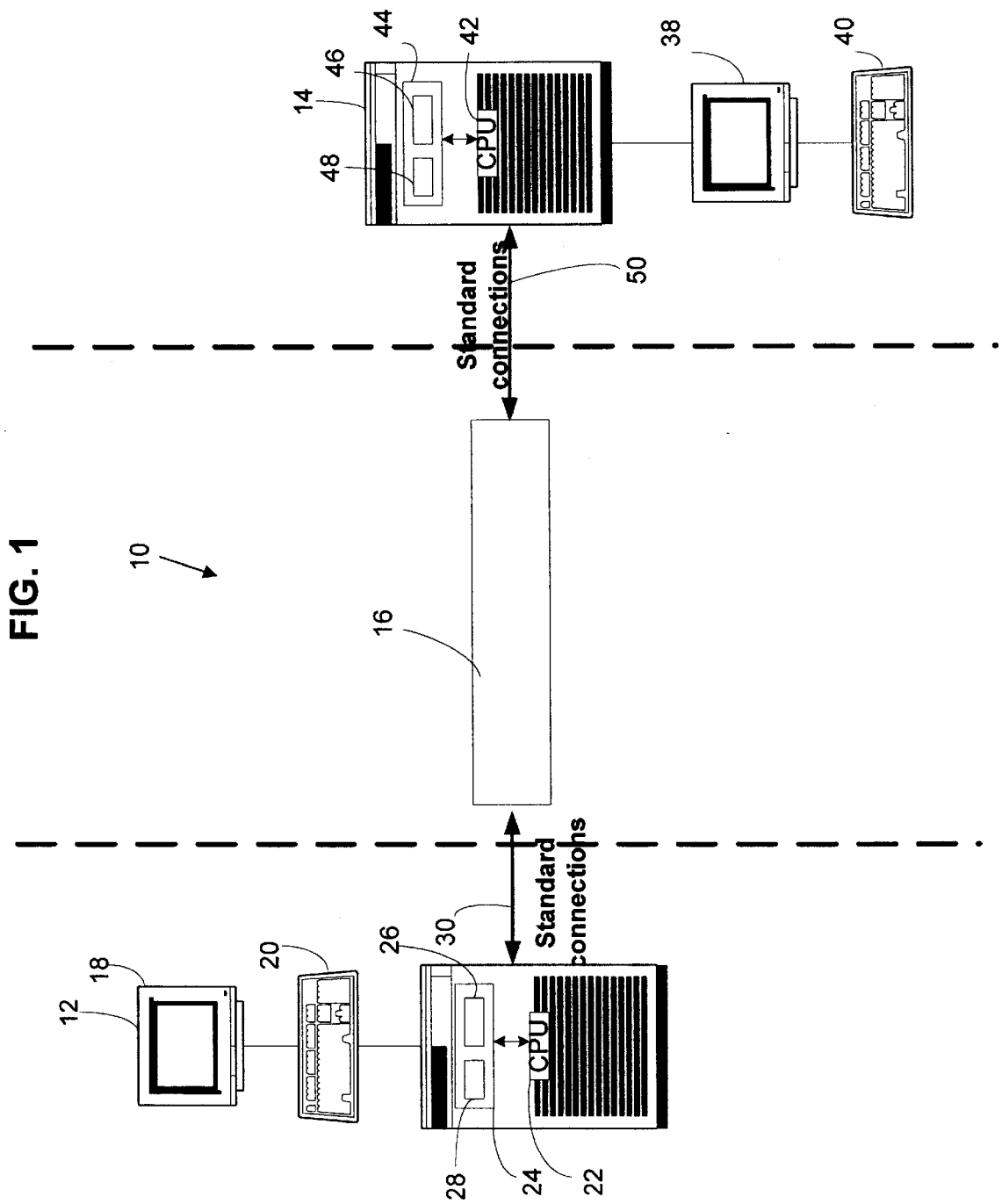
FIG. 1 is a block diagram of a secure data storage system according to an aspect of the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIG. 1 is a block diagram of a secure data transfer system 10 according to the present invention. The secure data transfer system 10 provides a secure interface between a first computer 12 and a second computer 14 via a secure storage device 16 which is connected to the computers 12 and 14. The computers 12 and 14 in this example are Intel processor, Windows Operating system type, personal computers. However, it is to be understood that the computers may be another type of personal computer, a server, a mini-computer, a mainframe computer, a super-computer, or any other computing device with an operating system capable of attaching peripheral devices.

The computer 12 has a video display monitor 18 and a user input device 20 which may include a keyboard or a mouse. The computer 12 has a central processing unit (CPU) 22 connected to an internal storage device 24 which is a hard disk drive in this example. The storage device 24 contains software such as an operating system 26 which provides instructions to the CPU 22 for basic operation of the computer 12. The storage device 24 also holds data in various files 28. It is to be understood that data types include text, images, multi-media, or any other type of digital computing data.

The connection between the computer 12 and the secure storage device 16 is made through a data connection 30 which may be used to send commands and data in the data files 28 stored on the storage device 24 to the secure storage device 16. The data connection 30 may be hardwired such as Ethernet cable, telephone wire or fiber optic cable or it may use wireless communications means. The data transfer protocol for the data connection 30 is preferably a common standard connection compatible with the operating system 26 such as TCP/IP, Serial, SCSI, IDE, etc. of the computer 12.

Similarly, the computer 14 has a video monitor 38 and a user input device 40 which may include a keyboard or a mouse. The computer 14 has a central processing unit (CPU) 42 connected to an internal storage device 44 which is a hard disk drive in this example. The storage device 44 contains application software such as an operating system 46 for basic operation of the computer 14. The storage device 44 also may hold data in various files 48.

The connection between the computer 14 and the secure storage device 16 is made through a data connection 50 which may be used to store data read from the storage device 16 in the storage device 44. The computer 14 is the system which has the capability of only reading the information on the secure storage device 16.

The secure storage device 16 provides a secure means of delivering data over the Internet in a computing application. The secure storage device 16 allows protection of data from alteration by persons on the read only end of the connection represented by the computer 14. The secure storage device 16 also prevents anyone from getting into a system represented by the computer 12 and infecting it with a virus or accessing the data storage 24 and changing data. This also has a high value inside a network by preventing users from damaging data or changing information without going across the correct channels. The present invention also may be applied to certificate servers (i.e. Verisign) and download sites (i.e. software vendors like Microsoft, IBM, etc.) since these sites build their value in allowing users access to download programs that were placed on the system by the company without fear of corruption. One aspect of the present invention is to add a second connection to a storage device such as a disk drive and prevent writing to the disk using the microcode in the firmware of the disk controller and/or drive electronics.

Figure 2:
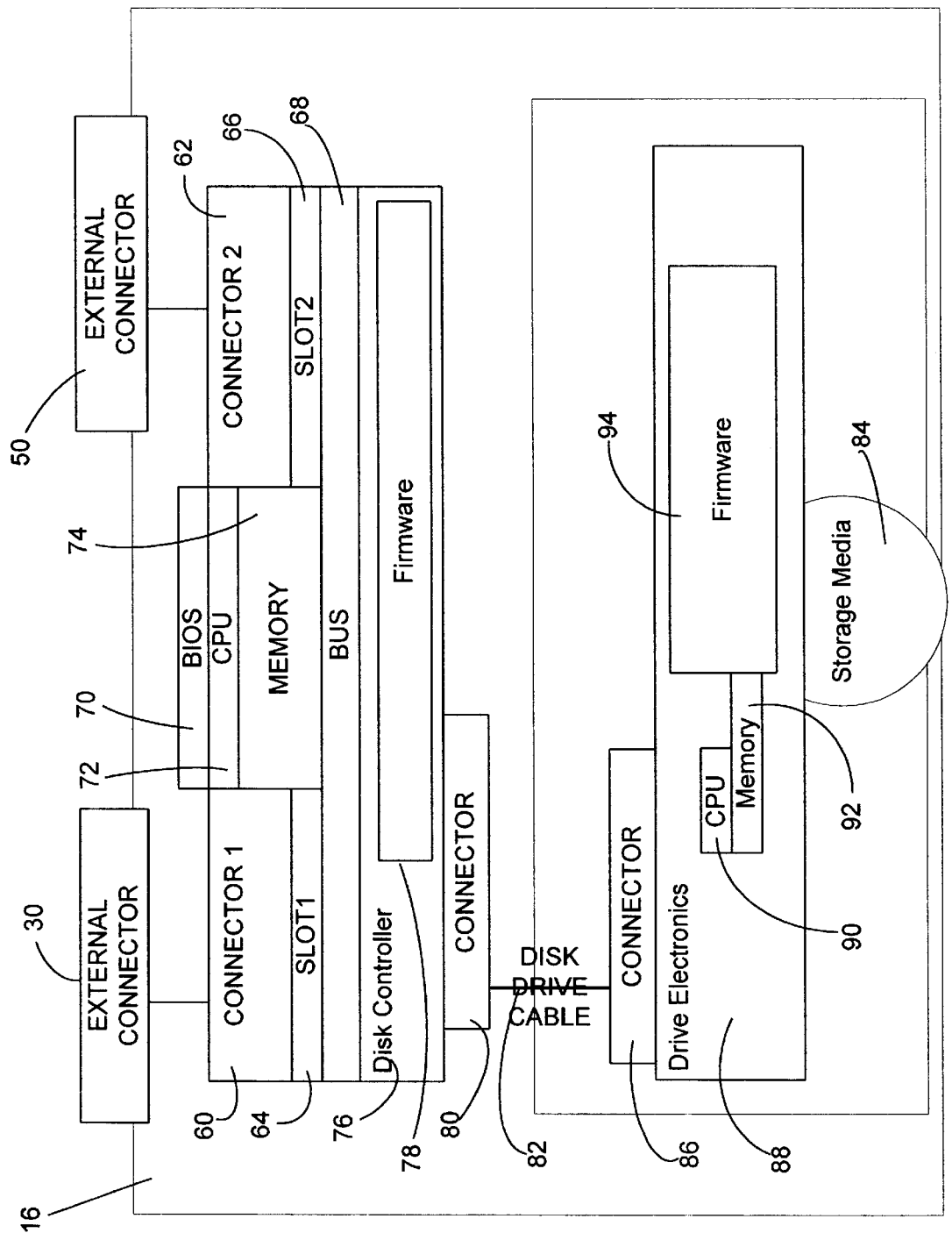
FIG. 2 is a block diagram of the secure data storage device in FIG. 1.

FIG. 2 is a block diagram of a secure data storage/transfer device 16 in FIG. 1. The secure data storage/transfer device 16 has dual external connectors 60 and 62 which are coupled to the data conduits 30 and 50. The data conduits 30 and 50 have unique external addresses, such as an IP address which represent the computing device such as the computers 12 and 14. Of course any type of data conduits such as fiber optic cable may be used between the storage device 16 and the computers 12 and 14. The external connector 60 in this example is a read/write connection, referred to as the active channel, while the external connector 62 is a read only connection, referred to as the passive channel. The external connectors 60 and 62 plug inside internally into slots 64 and 66 respectively. The internal slots 64 and 66 each have a unique slot number and are connected to an internal databus 68. The secure data storage device 16 has a BIOS 70, a CPU 72 and a memory 74 such as RAM or ROM all of which function to control the device operation. A disk controller 76 is used to manage data transfer and reads and/or writes from the data conduits 30 and 50. The disk controller 76 has a firmware module 78 which has imbedded microcode used to control the operations of the disk controller 76. The disk controller 76 has a connector 80 which is coupled to a disk drive cable 82. The disk drive cable 82 provides a data link to the actual storage media which is a hard disk drive unit 84 in this example. A second connector 86 is coupled to the cable 82 and in turn is coupled to a disk drive electronics unit 88. The drive electronics unit 88 has a CPU 90, a memory 92 and a firmware module 94 which operate the disk drive unit 84 in the normal manner known to those skilled in the art. The drive electronics unit 88 interfaces with the disk drive unit 84 which includes the hard drive platter or platters, motor, arm actuators, and appropriate read/write heads.

In this example, the firmware 94 of the drive electronics unit 88 is configured to allow only write access to data packets coming through the external connector 60 and the slot 64. A data packet includes a command request for action by the secure storage device 16 from the computing source which sent the data packet. The data packet is received by the secure storage device 16 through either the external connector 60 or 62 and is passed through the disk controller 76. The firmware 94 determines whether the packet was passed through the authorized connector which is the connector 60 in this example. The firmware 94 then determines whether the slot number of the internal slot which received the data packet is an authorized slot number. The firmware 94 then sets an active or passive switch based on the source of the data packet to determine what additional checks should be performed before it is determined whether the command in the packet should be processed. The firmware 94 then checks the command configuration contained inside the data packet and determines if the command has been configured to allow the data packet to be written to the storage device unit 84. The firmware 94 verifies whether the particular command request is authorized to be executed on the assigned connector 60 and 62 with their respective slots 60 and 62. If any check fails, the data packet is rejected and an error message is returned by the firmware 94. The secure storage device 16 then sends a message through the external connector 60 or 62 indicating that a write error has occurred due to lack of authority to write data. In this manner, only data packets from the computer 12 may be written to the storage media 24. Read commands are processed by the firmware 94 in the normal course and thus data may be read from the disk drive unit 84 from either the computer 12 or the computer 14 interfacing with the respective external connectors 60 and 62.

Alternatively, the firmware 78 in the disk controller 76 may be coded to perform the above mentioned checks on incoming data packets. As an added measure both the firmware 78 in the disk controller 76 as well as the firmware 94 in the drive electronics unit 80 may be programmed to perform the same checks for proper write authorization.

Figure 3:
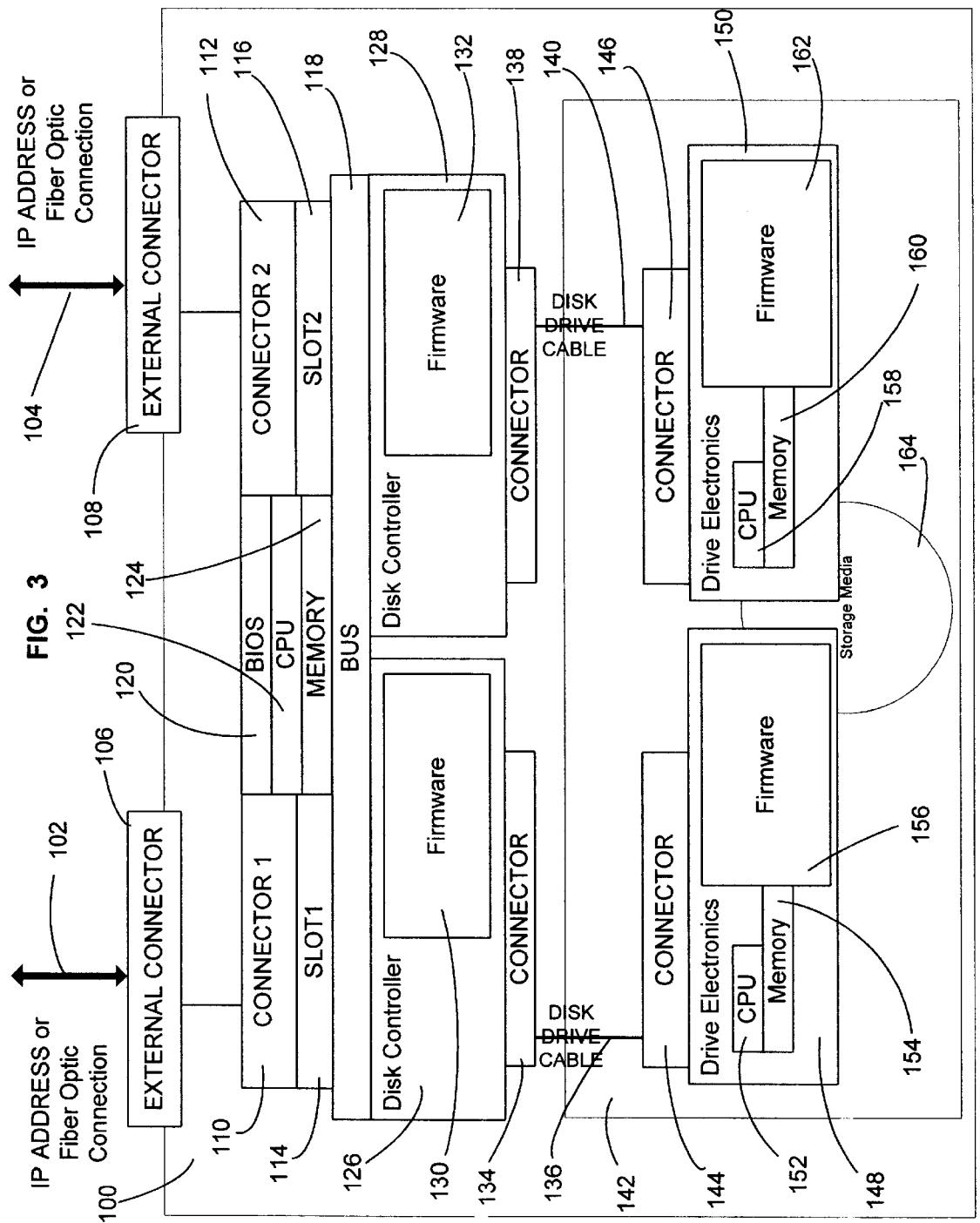
FIG. 3 is a block diagram of an alternate secure data storage device according to another aspect of the present invention.

A second hardware configuration for a secure data storage/transfer device 100 similar to the device 16 in FIG. 1 is shown in FIG. 3. As will be detailed, the secure storage/transfer device 100 provides an additional level of hardware security. The secure data storage/transfer device 100 allows outside computing devices to make connections to data conduits 102 and 104. The device 100 has an active external connector 106 and a passive external connector 108. It is to be understood the data conduits 102 and 104 may be hardwired or fiber optic connections. The external connectors 106 and 108 have unique external addresses, such as an IP address, which correspond with internal connectors 110 and 112. The internal connectors 110 and 112 plug inside internally into slots 114 and 116. The internal slots 114 and 116 each have a unique slot number and are connected to an internal databus 118. The storage device 100 has a BIOS 120, CPU 122 and a memory 124 which function to control the operations of the device 100. The storage device 100 has two disk controllers 126 and 128 with microcode in firmware modules 130 and 132 respectively. The firmware modules 130 and 132 control the operations of the disk controllers 126 and 128 respectively. The disk controller 126 has a connector 134 which is connected to a disk drive cable 136. Similarly, the disk controller 128 has a connector 138 which is connected to a disk drive cable 140. A disk drive unit 142 has a pair of connectors 144 and 146 which allow connection to the disk drive cables 136 and 140 respectively. The connector 144 is coupled to a disk drive electronics unit 148 while the connector 146 is coupled to a second disk drive electronics unit 150. The drive electronics unit 148 and the drive electronics unit 150 are housed on a circuit board in the disk drive unit 142. The drive electronics unit 148 has a CPU 152, memory 154 and firmware 156 to assist in disk functions for the disk drive unit 142. Similarly, the drive electronics unit 150 has a CPU 158, a memory 160, and firmware 162 to assist in disk functions. The drive electronics units 148 and 150 both interface with a disk storage media 164 which in this case is a hard disk with appropriate data storage platters, spin motor, arm actuator and arms with read/write heads.

In this example, the firmware 156 of the drive electronics unit 148 has been installed and configured exclusively to allow write access to data packets received from the connector 110 and the slot 114. An extra level of security is provided by the firmware 162 of the drive electronics unit 150 which is configured to allow only read commands from data packets received from the connector 112 and slot 116. In this manner, the firmware 156 which performs write functions cannot be tampered with via the external connector 112 since it is physically separated from this connector.

Thus, when a data packet is sent to the data storage unit 100, it is passed through the disk controller 126 to the drive electronics unit 148. The firmware 156 determines if the packet was passed through an authorized connector 110. The firmware 156 then determines whether the identification number of the internal slot 114 is an authorized slot number. The firmware 156 then sets an active or passive switch depending on the data source. The active or passive switch determines what additional further checks are performed before it is determined whether the command in the data packet should be processed. The firmware 156 then checks the command configuration and determines if the command has been configured to allow execution. If any check fails, the data packet is rejected and an error message is returned by the firmware 156. Of course other types of messages may be sent or other actions may be performed such as allowing access with a warning message returned to the computing source or physically shutting down the unit, if the firmware 156 is programmed for such instructions.

If a data packet is sent to the disk storage 100 from the connector 104, it is passed through the disk controller 126. The firmware 162 checks whether the packet was passed through an authorized connector 104. The firmware 162 then checks whether the internal slot 116 is an authorized slot. The firmware 162 then sets an active or passive switch to determine what additional further checks should be performed before it is determined that the command in the packet should be processed. The firmware 162 then checks the command configuration and determines if the command has been configured to allow execution. In this example, the firmware 162 will not allow write commands to be executed from the external connector 112. If any check fails, the data packet is rejected and an error message is returned by the firmware 162. Of course other types of messages may be sent or other actions may be performed if the firmware 162 is programmed for such instructions.

Alternatively, the firmware 130 in the disk controller 126 may be coded to perform the above mentioned check. As an added measure, both the firmware 130 in the disk controller 126 as well as the firmware 156 in the drive electronics unit 148 may be programmed to perform the same checks for proper write.

Essentially, any hardware or firmware component necessary for the write function to be enabled in a storage media device is capable of being altered and thus, a data access path is created with limited functionality i.e. having no write capability. This functionality is essential to securing a computing environment. Different types of storage devices such as solid-state memory and disk on chip (DOC) may be employed in the storage device 100.

This concept may also be applied to any storage devices placed into a large array which is shared by systems and computer devices on the network. These devices may be attached to a network using an Ethernet connection (Network Attached Storage (NAS)), a fiber channel (Storage Area Networks, (SAN)) or SCSI cables (Direct Attached Storage, (DAS)).

The storage devices 16 and 100 described above have built-in security measures and thus are not dependent on granted privileges that are easily circumvented. This provides an additional tool for application developers and infrastructure architects in designing secure areas within their internal and external networks and application systems. Additionally, two of the secure storage devices used in conjunction with one another could allow both a read only connection to the outside and a read write connection to the outside if needed. In this configuration, one of the devices would allow the users to read data and the other device would allow the users to write data. In another configuration one or more devices could be used inside a network to pass the information between different company business units.

Figure 4:
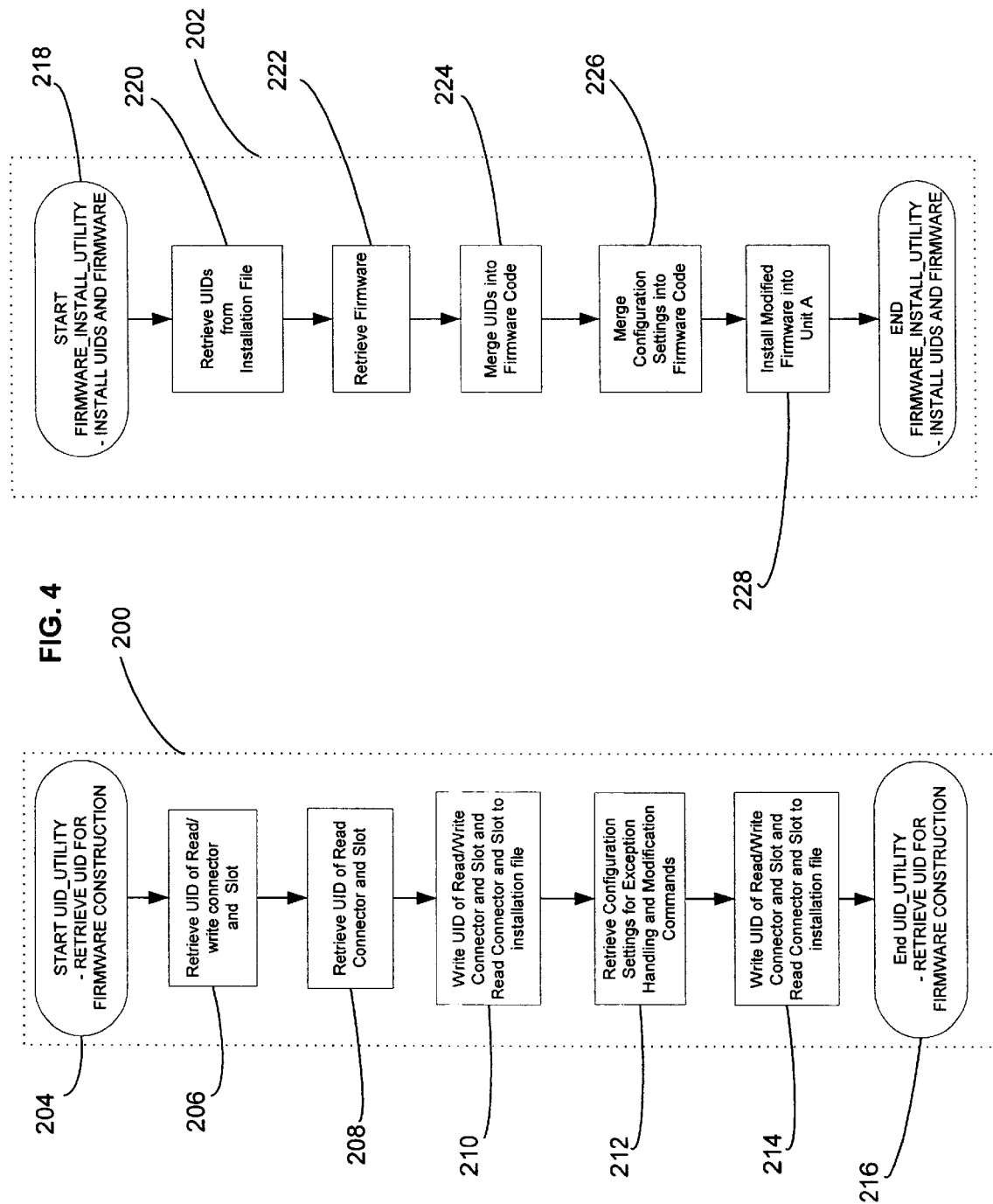
FIG. 4 is a flow diagram of the process-used to program the firmware used in the data storage device in FIG. 2.

FIG. 4 is a flowchart of a UID_UTILITY microcode module 200 and a FIRMWARE_INSTALL_UTILITY microcode module 202 which are used to program the firmware 94 in the secure storage device 16 shown in FIG. 2. The UID_UTILITY module 200 is used to retrieve information necessary to build security functionality into the firmware 94 of the storage unit 16. The FIRMWARE_INSTALL_UTILITY module 202 is used to retrieve the information collected by the UID_UTILITY module 200 and install the information into the firmware 94 of the storage unit 16. A start command for the UID_UTILITY in step 204 uses standard firmware code for disk controllers and drive electronics hardware such as C, C++ or Assembly for the disk controller 76 and the drive electronics unit 88. The unique identification code such as the IP address is retrieved in step 206 which identifies the logical identification code assigned to the data conduit to be designated as the read/write or active channel connection in the storage device 16. Additionally, the module retrieves the slot number that the connector is plugged into inside the storage device 16. The module then retrieves the unique identification code such as the address, which identifies the logical address assigned to the connection which will be designated as the read only connection or passive channel in step 208. The slot number of the slot that the read only connector is plugged into inside the storage unit 16 is also determined in step 208. The module then writes the unique identification code of the read/write connector and the read only connector to an installation file in step 210. The module then gathers the configuration settings for exception handling and configuration settings for modification commands in step 212. These configuration settings are described in FIG. 5 which will be explained below. The configuration settings are then written to a second installation file in step 214. The UID_UTILITY module 200 then ends in step 216.

The FIRMWARE_INSTALL_UTILITY module 202 starts with step 218. The module first retrieves the previously extracted unique identification codes extracted by the UID_UTILITY module 200 from the first installation file in step 220. The module then retrieves the firmware code which is to be installed in the disk controller 76 and drive electronics unit 88 in FIG. 2 in step 222. The firmware retrieved in step 222 is firmware which has been previously built to operate the hardware of the storage unit 16 according to manufacturer's specifications. This firmware has been constructed and modified to interact with the unique identification codes, the connectors, the slots, and the configuration settings gathered by the UID_UTILITY module 200.

The module 202 then merges the unique identification codes into the firmware code in step 224 which hard codes the unique identification codes and slot numbers into the firmware. The module 202 retrieves and merges the configuration settings from the second installation file with the firmware code in step 226. The module 202 installs the modified firmware code into the components of the storage unit 16 such as the disk controller or the disk drive electronics in step 228. The FIRMWARE_INSTALL_UTILITY module 202 then terminates.

FIG. 5 is an example of an Authorization Table 230, a Command Configuration 232, and an Exception Configuration Table 234 to be used and addressed in the microcode of the firmware. The tables 230, 232 and 234 represent the files necessary to house the configuration logic to direct the execution paths of the firmware. The Authorization Table 230 is used to assign the connector-to-hardware placement setting, and to assign the behavior of the connection between ACTIVE or PASSIVE. The ACTIVE connections are depicted as connections which will allow a "write" command to be executed. The PASSIVE connection is designated as "read only." This information is gathered by the UID_UTILITY module 200 and installed into the firmware by the FIRMWARE_INSTALL_UTILITY module 202, both explained above.

The Command Configuration Table 232 in this example contains all of the possible commands that a particular set of firmware will allow for a particular device. In the table 232, command identifiers (such as the name of the command) are depicted along with a flag (i.e. Allowable Indicator), which is used to determine if a particular command will be allowed through an ACTIVE or PASSIVE connection. Manufacturers may use different groupings of settings to create standard configuration sets. This flexibility in design allows total control of how the end product will behave. For example, some end users may desire devices which allow writes on ACTIVE channels but do not allow deletions, or vice-versa. This information is also gathered by the UID_UTILITY module 200 and installed into the firmware by the FIRMWARE_INSTALL_UTILITY module 202.

The Exception Configuration Table 234 determines what the unit should do when it encounters an error. The Table 234 determines whether the unit rejects all errors and passes a return code back to the sending computer or whether the unit simply allows a read function in the event of an error. This configuration allows for greater flexibility for the end users.

A LOGICAL TRIAL SETS table 236 shows an example of configured hardware coupled with the configuration of imbedded firmware for a particular unit. For illustration purposes, the configurations follow the examples given in the authorization table 230 and the command configuration table 232. The second box labeled "PACKET NUMBER" in table 236 shows how the configurations of hardware and firmware will cause the unit to react in different situations. The EXT CONN ABC designation designates an external connection ABC which is assigned an IP Address and is connected to a unit and internally installed into a hardware slot. The slot is a uniquely identifiable internal hardware with a unique identification number which is connected to EXT CONN ABC and may or may not be a physical slot. The EXT CONN DEF designation designates an external connection DEF which is assigned, for example, to an IP Address and is connected to a unit and internally installed into a hardware slot. The slot is a uniquely identifiable internal hardware with a unique identification number which is connected to EXT CONN DEF and may or may not be a physical slot.

In this example, the connector ABC has the unique identifier 1 and has been assigned the ACTIVE channel denoted by the word "RED." The connector DEF has the unique identifier 2 and has been assigned the PASSIVE channel "BLUE." If desired, a manufacturer could build the connector parts to be red and blue to correspond to the activity of the channels. The exceptions or errors have been configured to reject the packets if they violate the configuration rules. The subsequent cases depict how the unit would respond in each case.

If a Packet 1 comes to the connector ABC through Slot 1 with a "write" command, the firmware will allow the packet to be processed. If Packet 2 comes to the connector ABC through Slot 2 with an "any" command, the packet is rejected. The packet will be rejected because the connector ABC has not been configured in the Authorization Table 230 to work with slot number 2. The connector ABC has only been configured to work with slot number 1, regardless of the type of command requested. Therefore any command will be rejected. This protection prohibits penetration of the device in an unauthorized fashion by changing external connection identifiers or swapping connectors to function in different slots. If a Packet 3 comes to the connector DEF through Slot 1 with an "any" command, the packet is rejected. These logical tests prohibit outside parties from altering external connections and penetrating the security setup.

If a Packet 4 comes to the connector DEF through Slot 2 with a "read" command the firmware will allow the packet to be processed. If a Packet 5 comes to the connector DFF through Slot 2 with a "write" command, the packet is rejected. This protects the information on the unit. If a Packet 6 comes to the connector ABC through Slot 1 with a "delete" command, the packet is rejected because of the firmware configuration settings. If a Packet 7 comes to a connector HIJ through Slot 1 with a "write" command the packet is rejected because it does not match the firmware configuration. This also will prohibit intruders from penetrating the configuration rules. In the same way, if a Packet 8 comes to connector LMN through Slot 1 with a "read" command, it is rejected because it is not consistent with the configuration rules in the firmware. This configuration data is stored and is available to the firmware.

Figure 6:
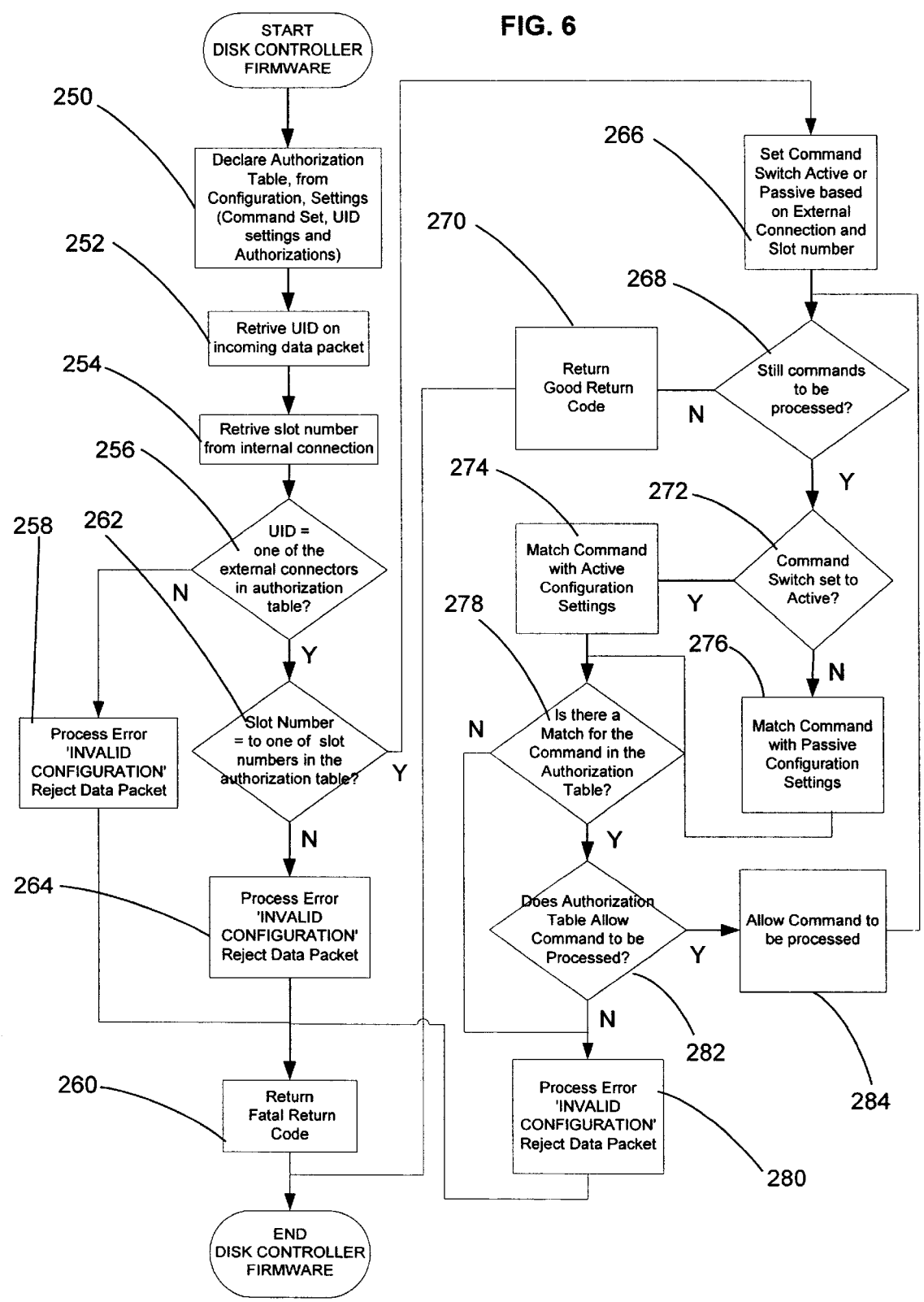
FIG. 6 is a flow diagram of the firmware installed on a disk controller in the data storage device of FIG. 2.

FIG. 6 is a software flowchart of the operation of the firmware 94 for the disk controller 76 in FIG. 2 after the UID_UTILITY and the FIRMWARE_INSTALL_UTILITY microcode modules 200 and 202 in FIG. 4 are run to program the firmware 94 and a data packet is received by the disk controller 76. The firmware 94 is used to disable write functions through a specific hardware connection to the storage device 16 as explained above. An authorization table is declared from the configuration, settings, unique identification, settings, and authorizations from the first and second installation files in step 250. These declarations in the firmware microcode are similar to the settings shown in FIG. 5. There is an authorization table declared which contains the external connection identifiers, the internal slot number identifiers (or the identifier which uniquely identifies what the external connector physically connects to) and the command set switch, being ACTIVE or PASSIVE as shown in the authorization table 230 in FIG. 5. These declarations also contain configuration command switches to determine the behavior of specific commands such as those in the command configuration table 232 in FIG. 5. These declarations also contain an Exception Configuration which will determine how the firmware will respond to the requesting computers in error situations such as the settings shown in the exception configuration table 234 in FIG. 5.

The firmware then retrieves the unique identification on the data packet which is received by the storage unit 16 in step 252. The slot number is then retrieved from the internal connector in step 254. The module then determines in step 256 whether the unique identification matches that of one of the external connectors 60 and 62 in the authorization table shown in FIG. 4. If the unique identification of the data packet does not match one of the external connectors, the module branches to step 258 where it creates a process error flag and rejects the data packet. The module then returns a fatal return code to the source of the data packet in step 260.

If the unique identification code matches that of one of the connectors 60 or 62 in step 256, the module determines whether the slot number of the slot coupled to the external connector corresponds to one of slot numbers in the authorization table shown in FIG. 4 in step 262. If the slot number does not correspond to one of the slot numbers, the module rejects the data packet in step 264. The fatal return code is then returned to the external connector which sent the data packet in step 260. If the slot number matches a valid slot number in step 262, the module sets the command switch active or passive based on the external connection identification code and slot number in step 266. The module then begins process command routines in step 268 by determining whether there are still commands to be processed. If there are no further commands, the module then returns a good return code to the external connector in step 270 and ends the routine. If there are further commands in step 268, the module determines whether the command switch is set to active in step 272. If the command switch is set to active, the module matches the command with active configurations setting from the appropriate table shown in FIG. 5 in step 274. If the command switch is not set to active, the module matches the command with the passive configuration settings from the appropriate table shown in FIG. 5 in step 276.

After the appropriate passive or active command is selected in either step 274 or step 276, the module determines whether there is a match for the command in the recalled authorization table in step 278. The command configuration table 232 in FIG. 5 stores the configuration settings which were previously installed into the firmware. The firmware will verify whether the associated command has an "Allowed Indicator" given the associated command switch for the command requested on the packet. Every firmware micro code includes certain commands for different functions and the commands verified will be, for example. READ, WRITE, UPDATE, ALTER, INSERT, DELETE, FORMAT, etc., or whatever commands the firmware uses to perform its functions.

If there is not a match for the command in the authorization table, a process error of invalid configuration is flagged and the data packet is rejected in step 280. The module then returns a fatal return code through the external connector in step 260. If there is a match for the command in the authorization table in step 278, the module determines whether the authorization table permits the command to be processed in step 282. If the authorization table does not allow the command to be processed in step 282, the module branches to step 280 and a process error of invalid configuration is flagged and the data packet is rejected. If the authorization table allows the command in step 282, the module proceeds to step 284 and allows the command to be processed. The module then loops back to step 268 to determine if there are any additional commands.

The commands listed in the command configuration table 232 in FIG. 5 are all of the possible commands which could occur in the firmware for both the ACTIVE and PASSIVE switch. Thus, settings may be made for each command and the possibility for errors is reduced. Also, each firmware micro code is different (ex. C, C++, Assembly, etc.) and therefore each contains its own set of commands which will be visible on the incoming packets. However, each firmware micro code command on an incoming packet has a specific purpose or function such as READ, WRITE, UPDATE, ALTER, INSERT, DELETE, FORMAT, etc.

It is to be understood that any "Put Input/Output" (PIO) commands should be disabled and a particular device may not be limited to the PIO commands listed in this example. The PIO commands are dependent upon the device type and firmware used to control the device. Each device and implementation may have different commands to control. Essentially any command which could modify the information on the media requires control. A similar firmware process could be used for the disk drive electronics unit 88 as shown in FIG. 2 to perform the same functions. Additionally, different steps of the software process could be located on the firmware for both the drive electronics unit 88 or the disk controller 76.

Figure 7:
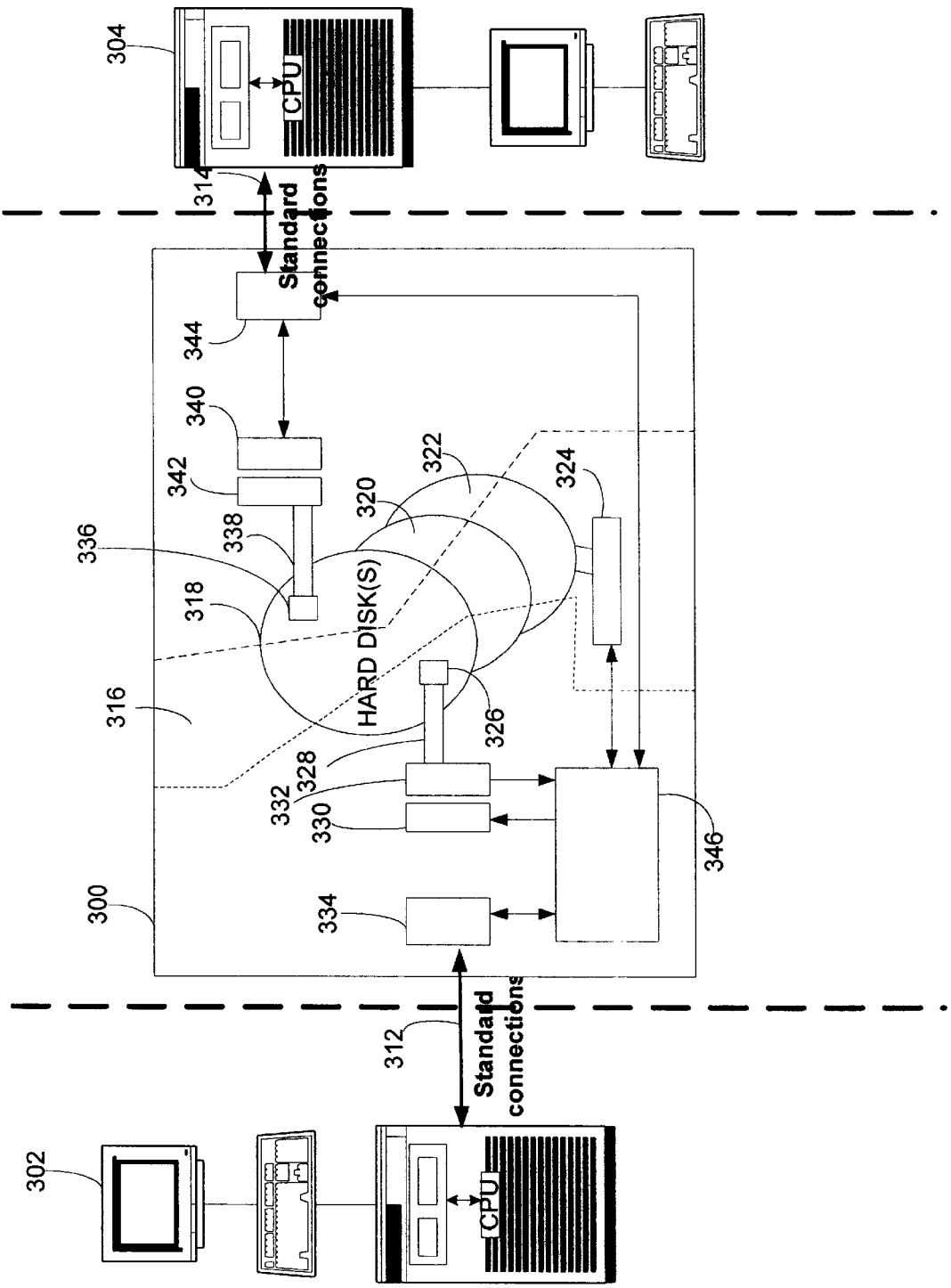
FIG. 7 is a block diagram of a secure data storage system according to another aspect of the present invention.

FIG. 7 shows a hardware embodiment of the secure storage device 16 in FIG. 1. The secure storage device 300 allows the reading and writing of data from a first computer 302 and the reading of data from a second computer 304. The secure storage device 300 has an active connectivity channel 312 which allows the reading and writing of information from the first computer 302. A passive connectivity channel 314 allows for only reading of information from the second computer 304. The secure storage device 300 also has a media device 316 which is capable of storing and retrieving computing information. In this example, the media device 316 is a series of platters 318, 320 and 322 which are covered with magnetic material for the storage of data by magnetic pulses. The platters 318, 320 and 322 are rotated by a spindle motor 324. Information is stored in magnetic pulse form and is organized by tracks and sectors which are known by the computers 302 and 304 in the form of a file allocation table as is commonly understood in the art.

The primary connectivity channel 312 has a read/write head 326 which is mounted at the end of an arm 328. The arm 328 is coupled to a head actuator 330 which moves the arm 328 and thus positions the read/write head 326 above the surface of the platter 318. The read/write head 326 senses and converts the magnetic signals on the platter 318 to electrical signals for the read operation. These electrical signals are sent to a preamplifier circuit 332 for amplification and signal processing. The read/write head 326 creates current to magnetize the surface of the platter 318 in order to write data on the platter 318. The head actuator 330 also moves other arms and read/write heads (not shown) for the other platters 320 and 322. The primary connectivity channel 312 exchanges data with the computer 302 via an interface 334 which is preferably an IDE or SCSI type interface.

Similarly, the passive connectivity channel 314 has a read only head 336 which is mounted at the end of an arm 338. The arm 338 is coupled to a head actuator 340 which moves the arm 338 and positions the read only head 336 on the surface of the platter 318. The read/write head 336 senses and converts the magnetic signals on the platter 318 to electrical signals for the read operation. These electrical signals are sent to a preamplifier circuit 342 for amplification and signal processing. The head actuator 340 also moves other arms and read only heads (not shown) for the other platters 320 and 322. The passive connectivity channel 312 exchanges data with the computer 304 via an interface 344.

A drive controller 346 regulates the operation of the secure data storage device 300. The drive controller 346 is coupled to the interfaces 334 and 344 and the preamplifiers 332 and 342 as well as the read/write head 326. The drive controller 346 provides control signals to the platter motor 324 and the head actuators 330 and 340 to allow movement of the platter 318 and the heads 326 and 336 to the correct track and sector on the platter 318 where the desired data is stored. The drive controller 346 converts digital data received from the computer 302 to current signals for writing magnetic pulses via the read/write head 326. The drive controller 346 also interprets requests from the computers 302 and 304 via the interfaces 334 and 344 in order to take signals from the corresponding preamplifiers 332 and 342 and convert them into digital signals for the requested data stored on the platter 318.

The drive controller 346 also contains firmware in order to order simultaneous or near simultaneous requests for data from the computers 302 and 304. In this case, the firmware on the drive controller 346 gives priority to requests from the primary channel 310. The drive controller 346 includes a memory cache to store pending requests while retrieving requests with more priority. However, other dispute resolution algorithms may be used.

The connection made between the computer 302 and the secure storage device 16 is made to the primary channel 312. The computer 302 thus has the capability of reading and writing data to the media 316 of the secure storage device 300.

In this configuration, the data accessed by the computer 304 is secure from unwanted intrusion because the read only head 336 of the passive channel 314 is accessible only to the computer 304. Thus, information may only be retrieved from the media device 316. The information that the user of the computer 302 wants to share with users of the computer 304 is written to the media device 316 of the secure storage device 300. Sensitive data is retained on the storage device of the computer 302 and cannot be accessed by the computer 304. Information thus travels from the computer 302 by its inherent operating system and stores the information to the secure storage device 300. The computer 304 uses its operating system and reads the information stored on the media device 316 through the passive channel 314.

The media device 316 may be fixed but need not be; it could be swapped out as long as the channel remains the same. For example, the media device 316 with the appropriate hardware could be a replaceable media such as a disk drive, ZIP drive, writable CD-ROMs, swappable disk packs and other storage media which may be replaced.

An additional advantage is that the risk of data corruption on the shared media device 316 is also eliminated because the secure storage device 300 only has one set of write heads controlled by the primary channel 312. Since heads such as the head 336 controlled by the passive channel 314 are read only, data corruption of file information on the media device 316 is physically impossible. The security of the information on the media device 316 is accomplished by physical separation which is superior to past methods involving software or firmware. This physical separation causes a break in the chain of continuous connectivity between the computers 302 and 304 and thereby both physically secures information on the primary channel 312 of the secure storage unit 300 from being altered and protects the computer 302 connected to the primary channel 312 because the computer 304 connected to the passive channel 314 cannot physically access the computer 302 on the primary channel 312. The read only head 336 of the passive channel 314 precludes software from being able to make the read only head 336 write to the media device 316 which provides absolute protection from unwanted intrusion.

Alternatively, a network switch could be added to the system which would prevent writing to the disk across the switch. The filter used for this could be based on IP addresses or MAC addresses or a specific range of addresses.

It is to be understood that the secure storage device 16 in FIG. 2 or the secure storage device 300 in FIG. 6 could have any number of different storage media including a disk drive or a writable CD drive with the appropriate supporting hardware and firmware/software. This method may be repeated indefinitely within a single device or may span multiple devices or disks and may contain added software/firmware for the purpose of validating, securing and massaging information as it travels through and resides inside the hardware device(s). Additional security could be accomplished by chaining additional hardware storage units similar to the secure storage device 16 in FIG. 2.

Figure 8:
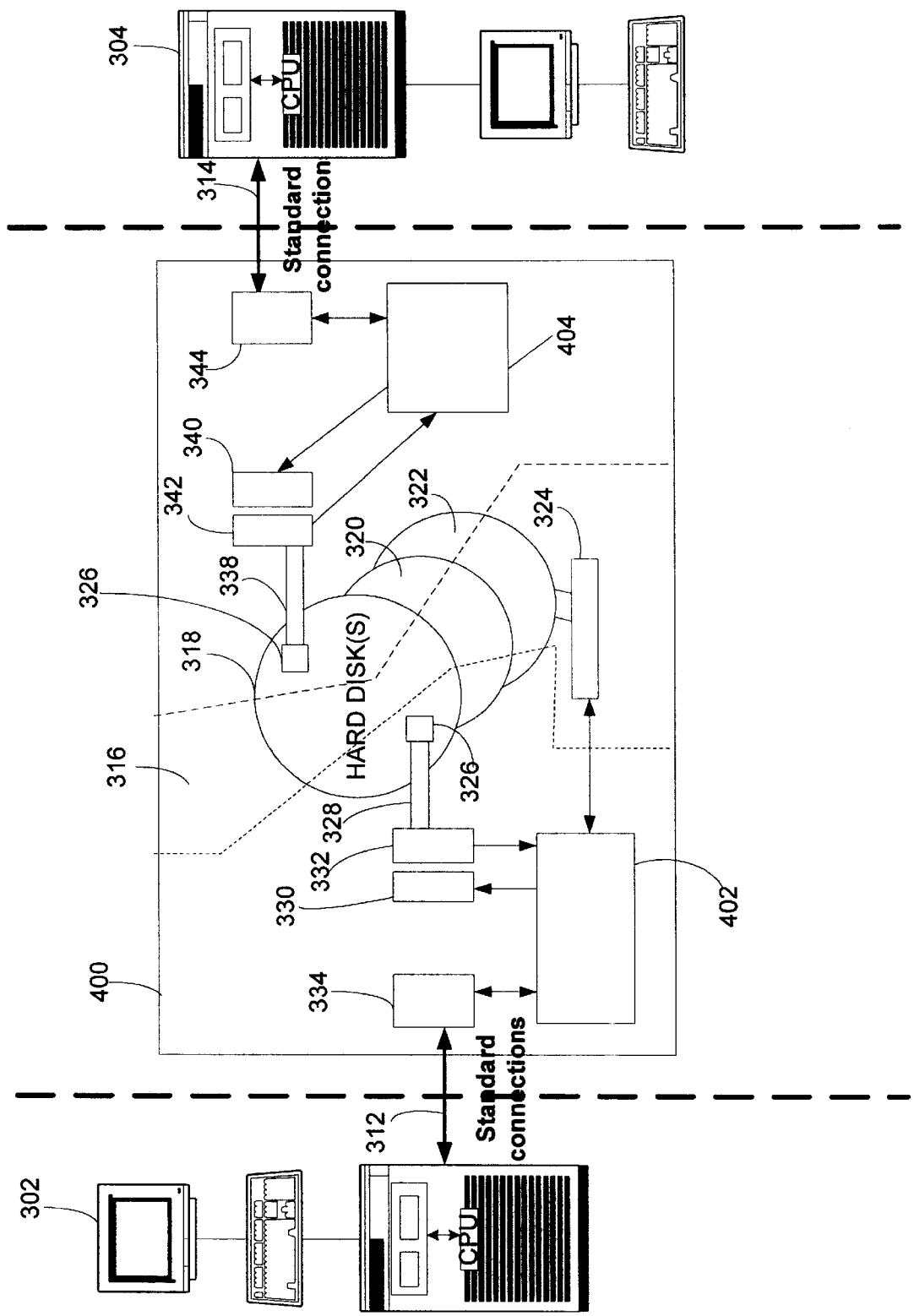
FIG. 8 is a block diagram of a secure data storage system with separate drive controllers according to another aspect of the present invention.

FIG. 8 shows an alternate hardware configuration for a secure storage device 400 similar to the secure storage device 300 in FIG. 7. Identical elements in FIG. 8 have identical element numbers to identical elements in FIG. 7. The secure storage device 400 has a dedicated primary drive controller 402 which is coupled to the head actuator 330 and the platter motor 324 to control the platters 318, 320 and 322. The primary drive controller 402 translates data requests from the interface 324 to read and write data on the platters 318, 320 and 322 via read/write heads such as the read/write head 326.

A separate passive drive controller 404 is also coupled to the head actuator 60 and the platter motor 324. The passive drive controller 404 receives requests for data on the interface 344 and controls the read operation to obtain data from the platters 318, 320 and 322. The passive drive controller 404 is coupled to the active drive controller 402 and will only perform read operations when the active drive controller 402 is idle. The passive drive controller 404 has firmware or software to arbitrate the activation based on the activities of the active drive controller 402.

It is also to be understood that the media device 316 inside the secure storage device 300 may be a single shared media between the primary and passive channels 312 and 314 as in the above description. However, the media device 316 may also include multiple media devices linked together with software or firmware to relay information from one media to the next. Additionally, it is to be understood that this concept is not limited to a single storage algorithm. For example, a multiple storage algorithm could be implemented whereby the primary channel has its own media and the passive channel or channels have their own media. The secure storage device would then have the necessary software or firmware to copy information from the primary media to the secondary media. The software/firmware would mirror the primary channel media to the passive channel media, thus continuing in the concept of having a primary media which is read/write capable to one computer while only having passive channels connected to the read only channels.

Figure 9:
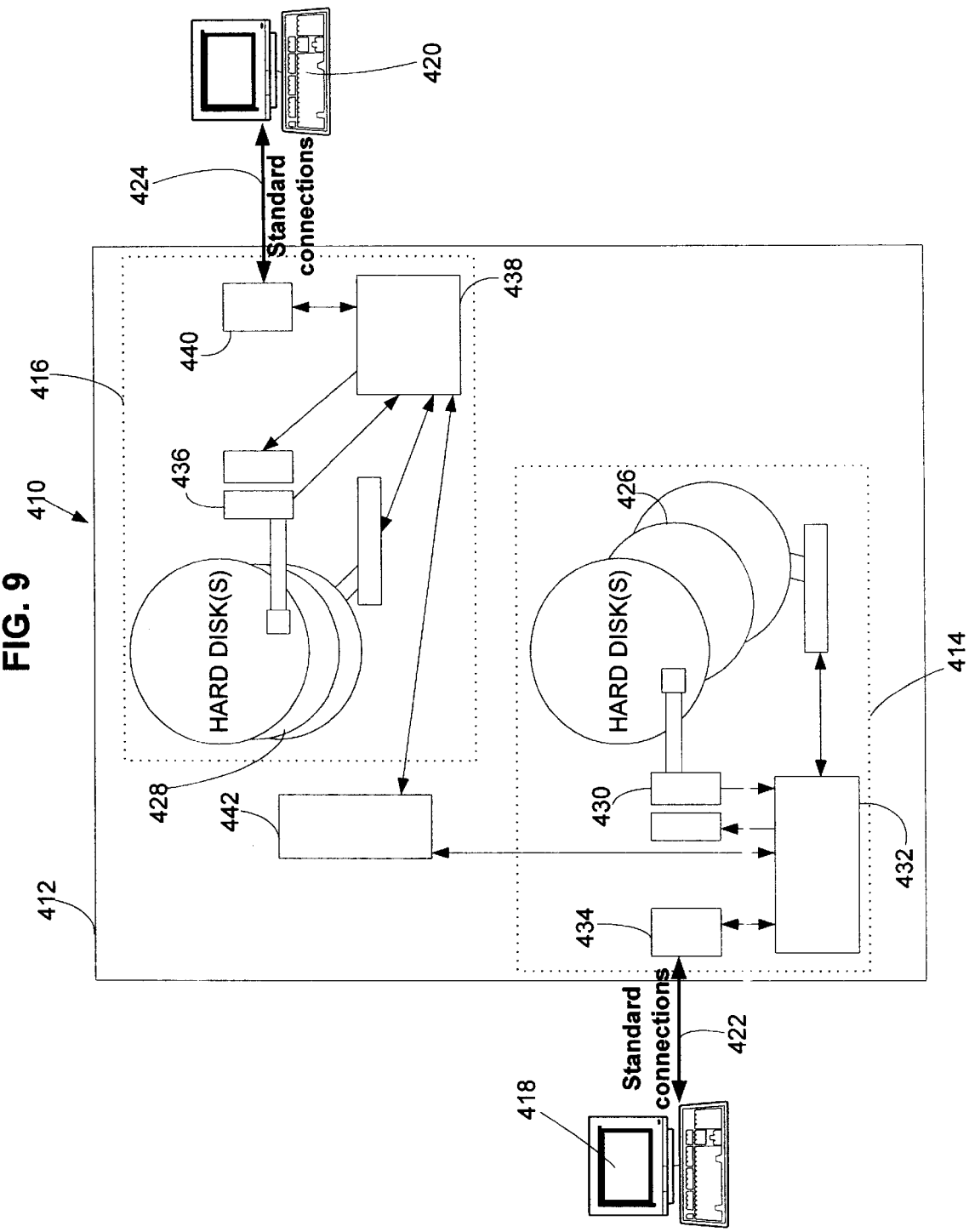
FIG. 9 is a block diagram of a secure data storage system with different read and read/write media according to another aspect of the present invention.

FIG. 9 shows such a secure storage configuration 410 which has a secure storage device 412 having two separate hardware storage devices 414 and 416 with embedded firmware in a first hardware storage device 414 which relays information from itself to the second hardware storage device 416 for added protection. The firmware may be programmed according to the process described in FIG. 4 for the functions described above in FIG. 6. These types of designs could be used in advanced security applications such as for the government or the military. The security storage configuration 410 allows a computer 418 to securely make data available to a second computer 420 by increasing the physical separation of the connection.

The secure storage device 412 has an active channel 422 which is connected to the computer 418 and a passive channel 424 which is connected to the computer 120. In this example, the storage device 414 has a series of platters 426 which serve to store data magnetically. Of course it is to be understood that any storage media may be used for the storage device 414. The data stored on the platters 426 is mirrored on a series of platters 428 of the storage device 416. Data is read from or written to the platters 426 via a read/write mechanism 430. The mechanical operation of the platters 426 as well as the read/write mechanism 430 is performed by a primary drive controller 432. The primary drive controller 432 receives and transmits data to the computer 418 via an interface 434.

Similarly, data is read from or written to the platters 428 via a read/write mechanism 436. The mechanical operation of the platters 428 as well as the read/write mechanism 436 is performed by a passive drive controller 438. The passive drive controller 438 receives and transmits data to the computer 420 via an interface 440. An interface circuit 442 is coupled between the controllers 432 and 438 and provides write instructions from the controller 432 to the controller 438 to activate the read/write mechanism 436 to write data on the platters 428.

Whenever data from the computer 418 is written to the platters 426, the controller 432 simultaneously transmits this data to the interface circuit 442. The interface circuit 442 sends the data to the controller 438 which causes the data to be written to the platters 428 via the read/write mechanism 436. In this manner the data on the platters 426 and 428 is always identical.

The controller 432 has firmware or software which only permits read operation of the read/write mechanism 436 in response to requests for data from the computer 420. The controller 432 also is programmed to wait until the end of any write operations from the interface circuit 442 before proceeding with a read operation.

Figure 10:
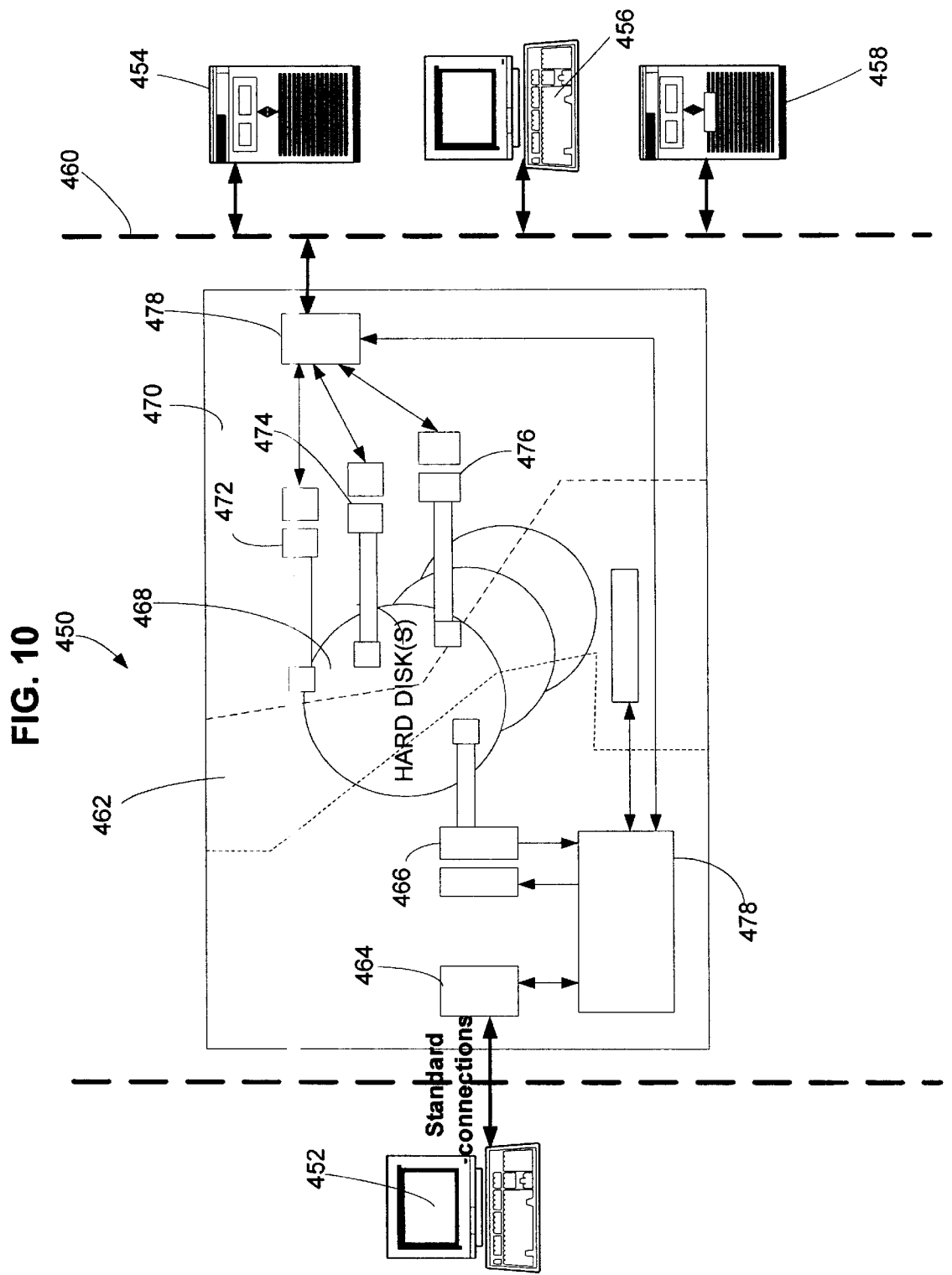
FIG. 10 is a block diagram of a second type of secure data storage system according to one aspect of the present invention whereby multiple computers may access common data.

FIG. 10 shows an alternate embodiment of a secure storage device system 450 which has multiple passive channels accessing the same shared media with a single primary channel. The system 450 allows for rapid deployment of information over separate passive channels. For example, this configuration would allow efficient retrieval of real time information which is desired from multiple sites such as stock price quotes. The system 450 has a central computer 452 which has access to real-time data. The real-time data is requested by a number of other computers 454, 456 and 458 which may be workstations, personal computers, laptops etc. The other computers 454, 456 and 458 are connected to a network 460 which allows data exchange. The network 460 is the Internet in this example but other networks such as an Intranet may be used.

A secure storage device 462 is interposed between the central computer 452 and the computers 454, 456 and 458. The secure storage device 462 is connected to the central computer 452 by a primary channel 464 having a read/write mechanism 466 which allows reading and writing of data to a media device 468. The media device 468 is a series of hard disk platters although other storage devices may be used.

A passive channel 470 has a number of read head mechanisms 472, 474 and 476 each of which may read data stored on the media device 468. A drive controller 478 allows requests for data for each computer to be dedicated to a particular read head mechanism 472, 474 and 476. This could be accomplished by dedicating each passive channel read head to a particular port of connection in the storage device 462. Consequently, each read head mechanism 472, 474 and 476 would satisfy a request for information separate from the other channels. Simultaneous reads may thus be performed from the read heads 472, 474, 476, which facilitates the access to data on the media device 468.

Of course it is to be understood that the secure storage device 16 in FIG. 1 or the device 300 in FIG. 7 may be constructed and installed within any computer which is connected to an external network such as the Internet, Evernet, Intranets, or an Ethernet. Such an installation gives the ability to protect the computer from unwanted intrusion from the network environment.

For example, the computer 12 in FIG. 1 may possess a detailed data base of medical patients and their medical history data stored on the storage device 24. Such data is sensitive and confidential and, as such, required to be inaccessible to the general public. When the computer 12 is connected to the Internet, there is a risk of unwanted access to the storage device 24. However, parts of such data may need to be accessible, for example for the purpose of publishing reports regarding the number of cases of certain illnesses for a given governmental jurisdiction. In this instance, the secure storage device 16 is connected to the computer 12 which enables the computer 12 to run an application which produces summary reports devoid of sensitive details for storage on the secure storage device 16.

In this case, the computer 14 is a web hosting computer which accesses the secure storage device 16 through the data conduit 50 which is an Internet connection in this example. The stored report would then be visible on the Internet via a web browser. However, the data contained in the medical database on the storage device 24 is inaccessible from the computer 14 and the Internet because the passive channel 34 of the secure storage device 16 is only physically capable of reading information on the media device 36. Consequently, security issues brought about by continuous connectivity to a storage device are solved through the use of the secure storage device 16.

Figure 11:
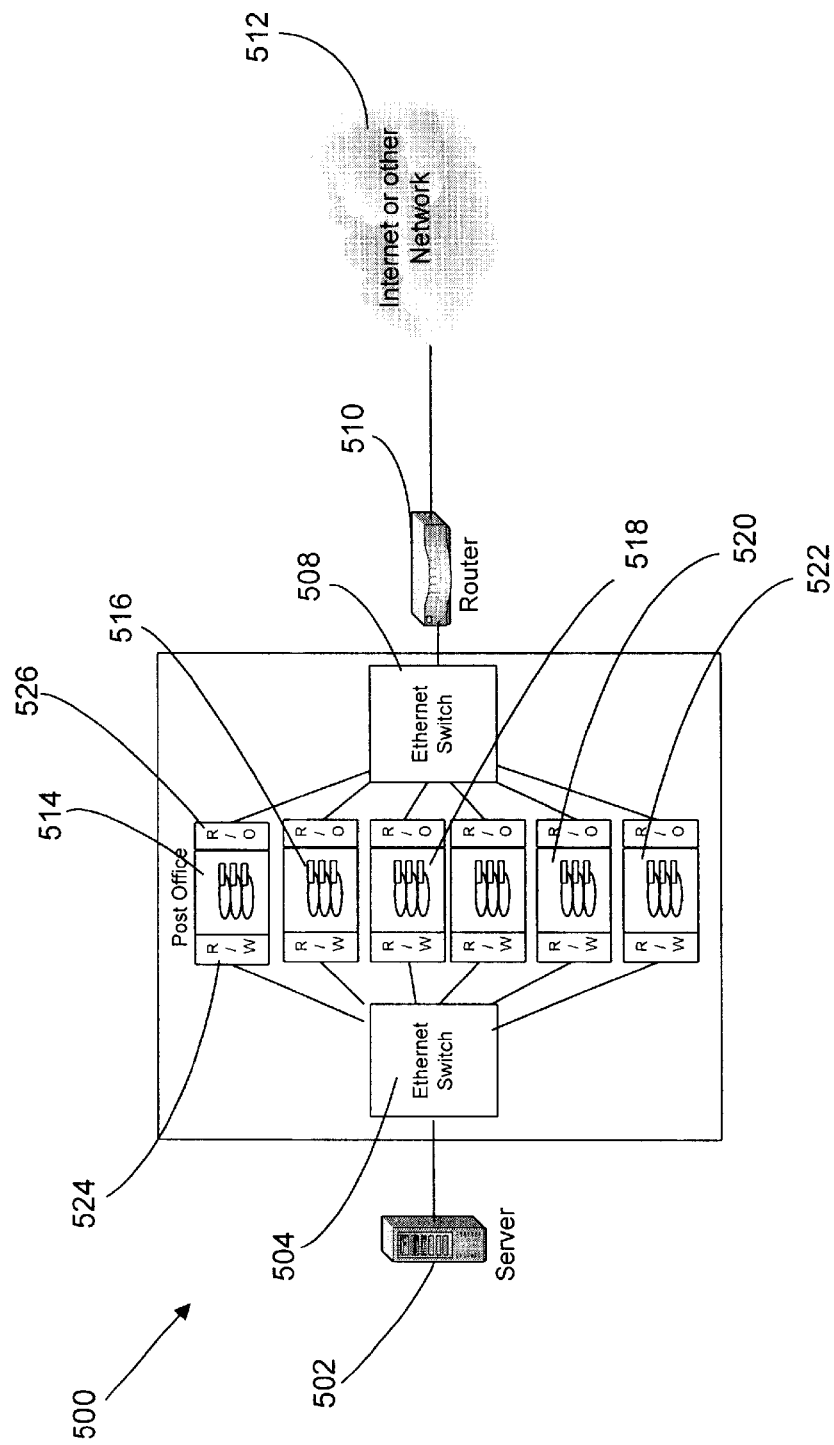
FIG. 11 is a block diagram of a post office application using a secure storage device according to an aspect of the present invention.

FIG. 11 is an example of how the secure storage device 16 in FIG. 2 may be used in a disk array system 500 which is a "POST OFFICE" box for electronic data. The system 500 is specifically designed to place information bound for different clients in different "post office" boxes, or storage units. The system 500 allows a centralized system or vendor to segregate information by company without the threat of penetration and modification because the connected users are only permitted read access by the hardware. A central server 502 is connected to a data router such as an Ethernet switch 504. A central storage unit 506 houses the Ethernet switch 504 connected to the central server 502 as well as an external interface Ethernet switch 508. The external interface Ethernet switch 508 is coupled to a router 510 which is in turn coupled to a network 512 such as the Internet or an intranet.

The central storage unit 506 has a set number of secure storage units 514, 516, 518, 520 and 522 which are similar to the secure storage unit 16 described in FIG. 2. Each secure storage unit such as the secure storage unit 514 has one read/write or active interface 524 coupled to the Ethernet switch 504 and a read only or passive interface 526 which is coupled to the external Ethernet switch 508. The central server 502 writes information on the different storage units 514, 516, 518, 520 and 522 and the users of the information access the storage units 514–522 through the read only interface via the Ethernet switch 508. It is to be understood that other types of switches may be used for the Ethernet switches 504 and 508.

Figure 12:
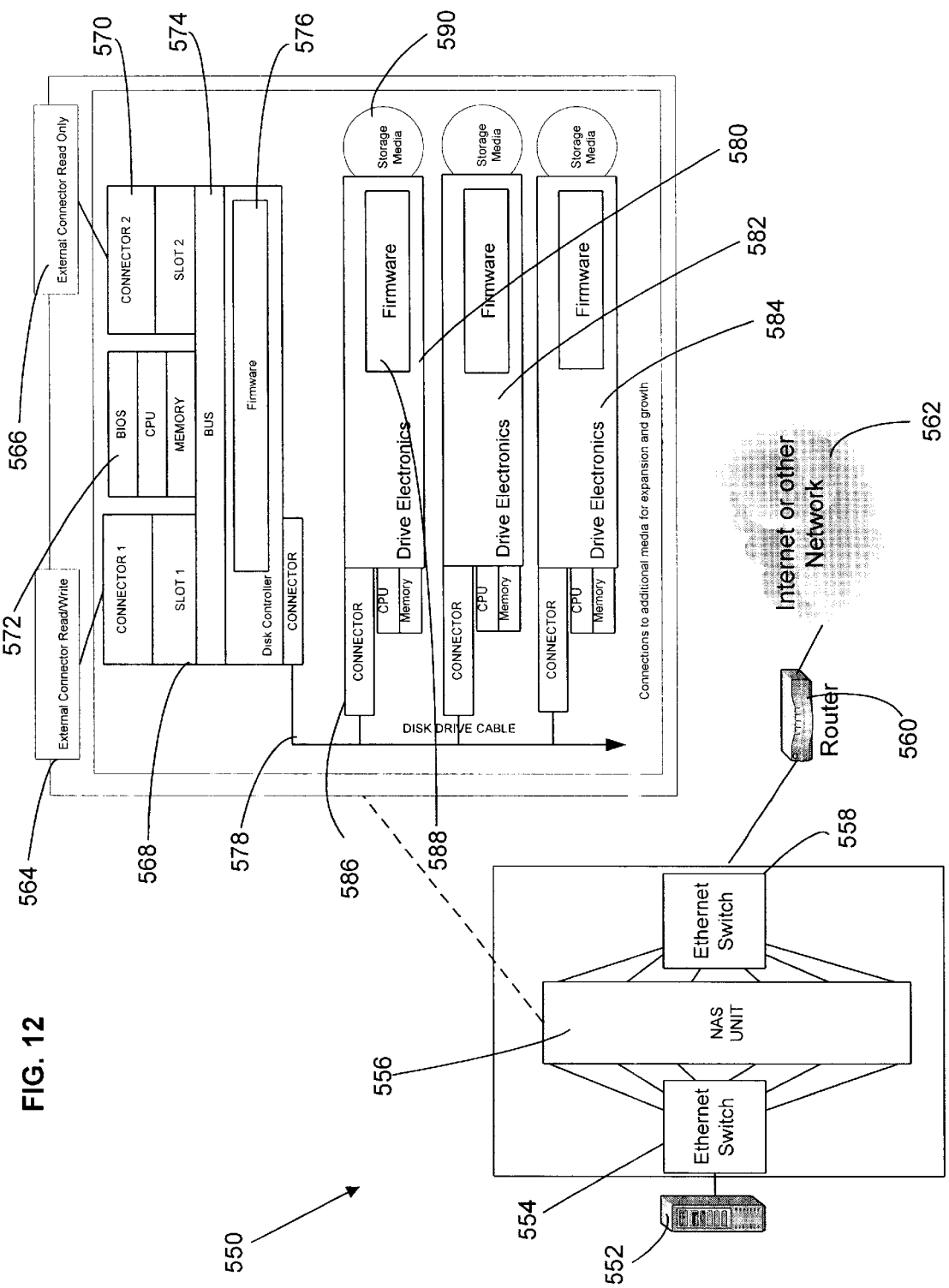
FIG. 12 is a block diagram of network addressable storage configuration using a secure storage device according to an aspect of the present invention.

FIG. 12 shows a network address storage (NAS) system 550 which can be used to provide a secure means of delivering information. Servers, which have access to the read/write interfaces, can write information on the NAS system 550 and other servers which have read interfaces may access data stored on the NAS system 550. Servers that have read access cannot write or corrupt information stored on the NAS system 550 due to the secure data storage devices similar to that described in FIG. 2.

A server 552 accesses an Ethernet switch 554 which is connected to a network address storage (NAS) unit 556. The NAS unit 556 is also connected to a second Ethernet switch 558. The second Ethernet switch 558 is connected to a router 560 which in turn is connected to a network 562 and/or an external environment, such as the Internet.

The NAS unit 556 is similar to the secure storage device 16 in FIG. 2 and has an active external connector 564 and a passive external connector 566. The connectors 564 and 566 are assigned unique identification addresses. The NAS unit 556 has a connector unit 568 with a unique slot number which is coupled to the active connector 564 and a connector unit 570 with a unique slot number which is coupled to the passive connector 566. A CPU 572 dictates the operations of the NAS unit 556. A databus 574 connects the connector units 568 and 570 to a disk controller 576. The disk controller 576 has firmware similar to that described in FIG. 9 for the purpose of controlling the reading and writing of data from the external connectors 564 and 566.

The disk controller 576 is coupled to a disk drive cable 578 which connects data storage units 580, 582 and 584. In this case, the data storage units 580, 582 and 584 are hard drive platters. The storage unit 580 has a connector 586 which allows connection to the disk drive cable 578. The storage unit 580 also has a drive electronics unit 588 with appropriate firmware to access and operate a media storage device 590. In this manner, the firmware in the disk controller 576 allows only read requests from the external connector 566. The server 552 sends and retrieves data through the active connector 564 and may read and write data on any of the storage units 580, 582, and 584. The servers and computers coupled through the Internet or other networks 562 access the storage units 580, 582, and 584 through the passive connector 566. These servers and computers are able only to read information on the storage units 580, 582, and 584. Thus, the NAS unit 556 is capable of growth and expansion of additional storage units as needed. Of course, the firmware which determines the identity of the data may also be installed in each of the disk electronics units. Additionally, this network storage is not limited to Ethernet connections. For example, fiber optic storage equipment could be used rather than Ethernet connections.

Figure 13:
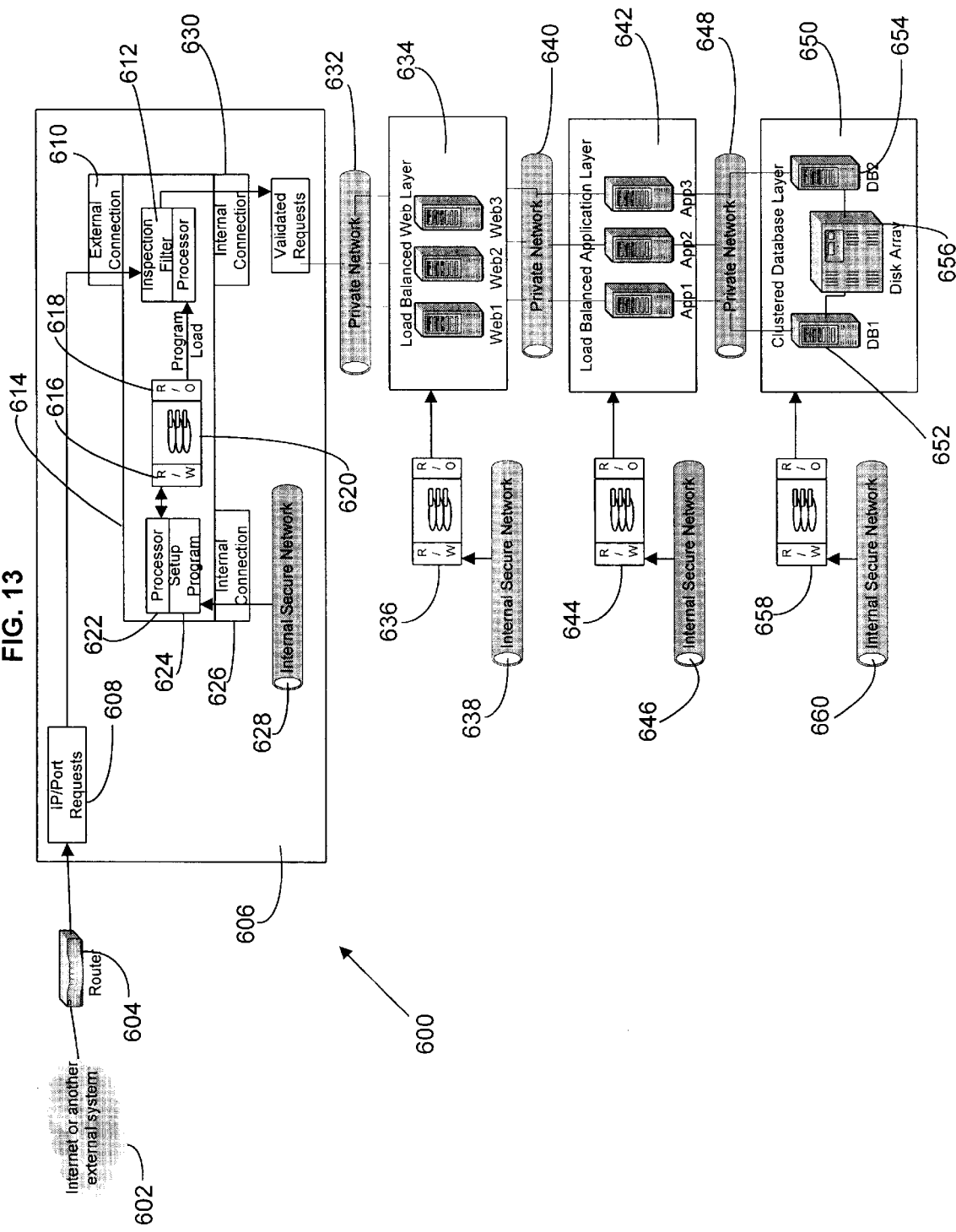
FIG. 13 is a block diagram of a firewall system using a secure storage device according to an aspect of the present invention.

FIG. 13 is a block diagram of a firewall system 600 which has a number of dual interface storage devices similar to the secure storage device 16 in FIG. 2. The firewall system 600 prevents the modification of firewall code from an outside interface. An external system 602 such as an Internet or another external system passes a request for information through a router 604. The router 604 receives the request and passes it to a firewall 606. The firewall 606 has a port 608 which is coupled to the router 604. Data received through the port 604 is sent to an external connector 610 which passes the request to an inspection filter 612 using the processor code extracted from a secure storage device 614. The secure storage device 614 has a read/write connection 616 and a read only connection 618 which both are connected to a storage media 620. The read only connection 618 of the secure storage device 614 ensures that the request from the external system 602 will not manipulate the firewall code read from the storage device 614. The firewall code is stored in the storage media 620 from a processor 622 which accesses a stored setup program 624. Additional information may be relayed through the processor 622 and the setup program 624 to the secure storage device 614 via an internal connection 626 which is coupled to an internal secure network 628.

If the request is deemed to be appropriate by the inspection filter 612, the request is passed through an internal connection 630 and is considered a validated request. The validated request is sent to a private network 632. The private network 632 may include a Web server layer 634 or other Internet information server layer such as an ftp server. If necessary, the Web server layer 634 may retrieve information from another secure storage device 636 similar to the storage device 16 of FIG. 2. Data is written on the secure storage device 636 by an internal secure network 638.

If the secure storage unit 636 does not contain the necessary information, the request is passed through a second private network 640 to an application layer 642. The application layer 642 retrieves information from a read only connection of another secure storage unit 644. Another internal secure network 646 supplies information to the secure unit 644 through the read/write channel of the secure storage unit 644.

If the secure storage unit 644 does not contain the necessary information, the request is passed through another private network 648 to a database layer 650. The database layer 650 includes two database servers 652 and 654 and a disk array 656 in this example. The database layer 650 is coupled to the read only connection of a secure storage device 658 which is connected to an internal secure network 660. Once the data request is satisfied, it is passed back through the network connections to the requesting user in the external environment 602. In this manner, all information from the internal secure networks 638, 646 and 660 are secured from modification from outside connections by the secure storage devices. It is to be recognized that only portions of this implementation may be constructed to fit the appropriate need.

Figure 14:
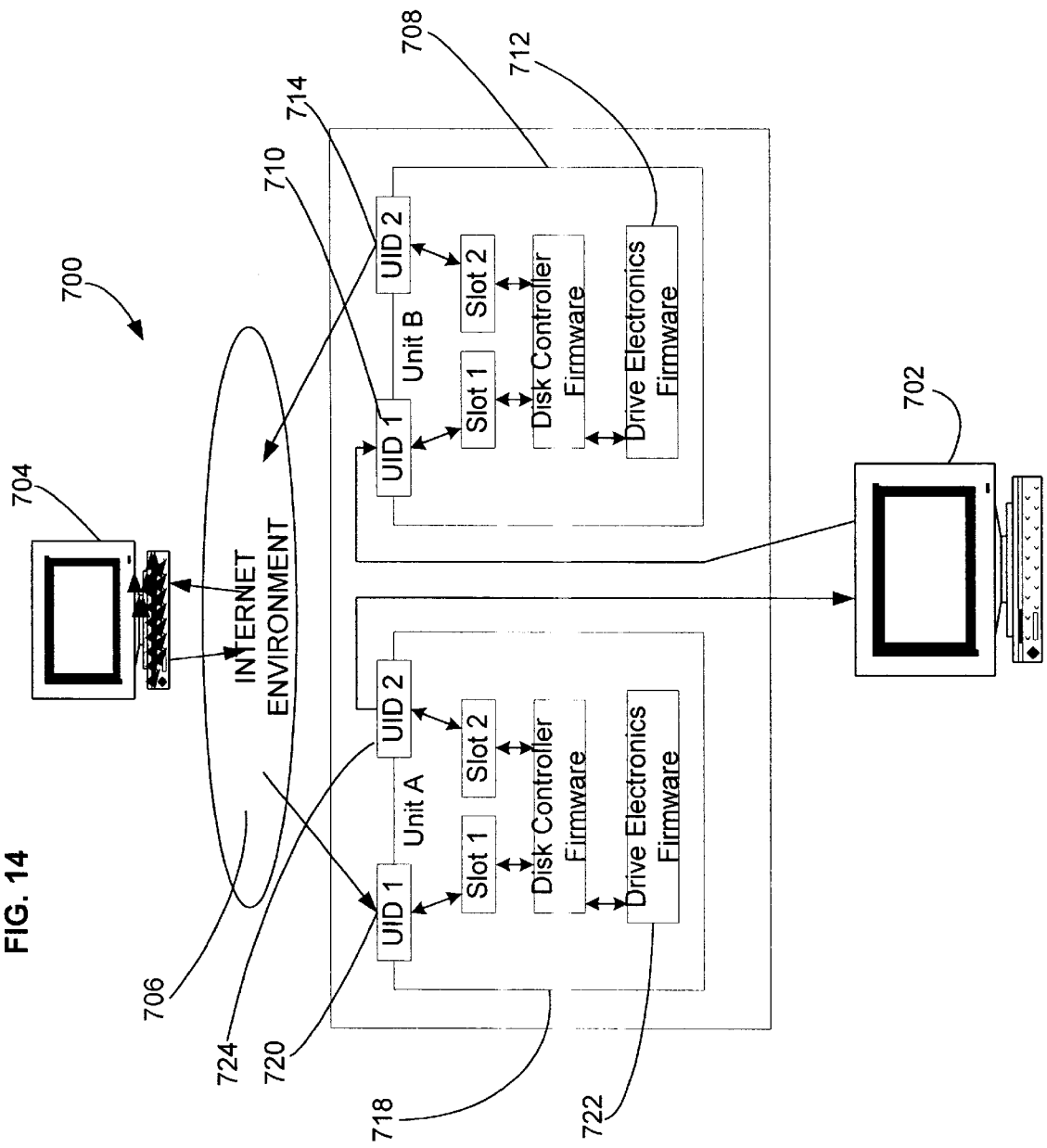
FIG. 14 is a block diagram of a secure connection system using the Internet.

FIG. 14 shows an alternate application of the present invention which allows two way communications in a computer system 700. The computer system 700 has a first computer 702 and a second computer 704. In this case the computers 702 and 704 communicate over a network 706 such as the Internet. Secure communications are established between the first computer 702 to the second computer 704 via a secure storage device 708 which is similar to the storage device 16 in FIG. 1. The secure storage device 708 has a primary channel 710 which is connected to the first computer 702 which allows reading or writing data on a media device 712. The data stored on the media device 712 may only be read by a passive channel 714 which is coupled to the second computer 704.

The computer 704 may also relay secure information to the computer 702 via a second secure storage device 718 which is installed between the computers 702 and 704. The secure storage device 718 is similar to the storage device 16 described in FIG. 2. The secure storage device 718 has an active channel 720 which allows writing of data on a media device 722 which stores information. A passive channel 724 is coupled to the computer 702 and allows read only access to the information stored on the media device 722. The active channel 720 is coupled to the computer 704 and allows both read and write functionality. This additional configuration allows the computers 702 and 704 to exchange information back and forth without a physical continuous connectivity between them.

Figure 15:
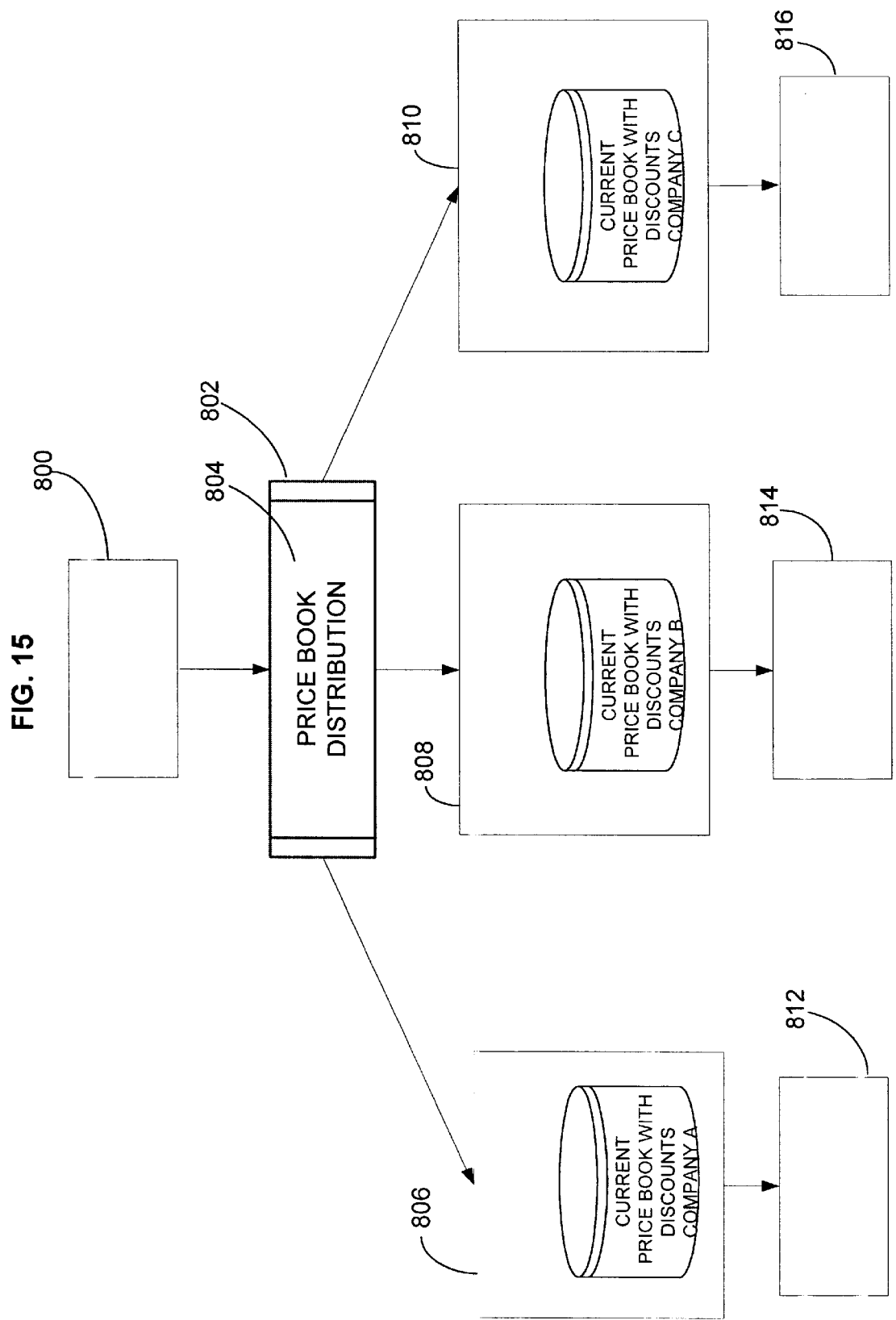
FIG. 15 is a block diagram of a business system for dissemination of confidential customer information.

The secure storage device allows facilitation of business transactions. For example, FIG. 15 shows a vendor business 800. The vendor business 800 has a software application 802 executing within their own internal legacy computing system network 804. The computing system network 804 is designed to distribute price book information to certain customers 806, 808 and 810. The price book information for the customer 806 is stored on a secure storage device 812 which is dedicated to the specific customer 806. Similarly, price book information for the customer 808 is stored on a secure storage device 814 and price book information for the customer 810 is stored on a secure storage device 816. The customers 806, 808, and 810 can thus access their own price book information from the application 802 through access to the storage devices 812, 814 and 816 without being able to access each other's customer information contained in the other storage devices.

Of course it is to be understood that this system may be used for other types of sensitive data. For example, the system could be used to distribute health care information. Each patient would have information written on the secure storage devices 812, 814 and 816. The information is written on the storage devices by the internal computing system 804. In this manner, each patient has access to their own health care information without being able to access each other's customer information contained in the network.

Figure 16:
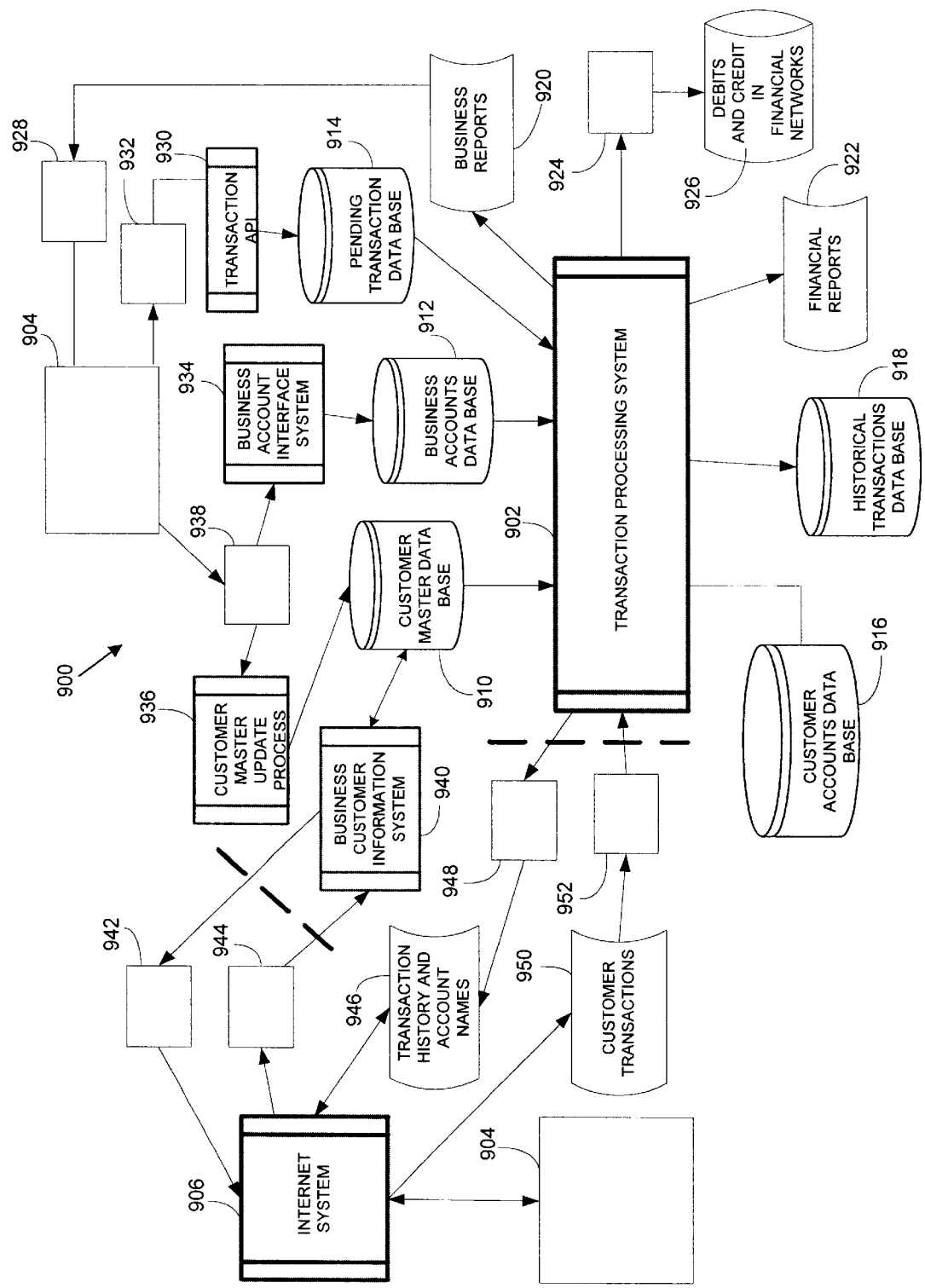
FIG. 16 is a block diagram of a business computer system allowing a variety of secure vendor and customer transactions.

Another example of a secure data exchange system is shown in FIG. 16 which is a business computer system 900 using various secure storage devices similar to the secure storage device 16 in FIG. 2. The business computer system 900 has a transaction processing system 902 which is a centralized system which controls various business transactions over the Internet as well as business to business, EDI or other forms of electronic transactions. Various businesses designated as element 904 may have direct electronic communication with the processing system 902. Other customers or businesses may access the processing system 902 via an Internet server 906.

The processing system 902 has access to various databases, which record data on transactions integral to the business. These databases include a customer master database 910, a business accounts database 912, a pending transaction database 914 and a customer accounts database 916. The data from the databases 910, 912, 914 and 916 are used by the processing system 902 to create and maintain a historical transactions database 918. Using the data in the various databases, the processing system 902 generates business reports 920 and financial reports 922.

Various other financial networks 926 may receive data from the processing system 902. These financial networks 926 include national bank debit and credit processing. Thus, the use of a secure storage device 924 serves to protect the processing system 902 from intrusion through the pathway of the financial networks 926. The business reports 920 may be made available to interested parties by loading them on a secure storage device 928. In such a manner, a user could request the business reports 920 but be insulated from further financial information managed by the processing system 902.

Various transaction systems may also utilize the security features of the storage devices. The business computer system 900 has a transaction system 930 for running application interfaces to provide electronic transactions. The transaction system 930 interacts with the pending transaction database in order to receive accounts receivables from the participating business 904. A secure storage device 932 allows the business 904 to pass information to the processing system 902 without fear of penetration from the pathway created by the storage device 932.

The business computer system 900 also has a business account interface system 934 which provides data for the business accounts database 912 and a customer master update processing system 936 which provides data for the customer master database 910.

A business customer information system 940 also interacts with the Internet server 906 to provide on line billing transactions to customers 904 over the Internet. The business customer information system 940 interfaces with the customer master database 910 and supplies appropriate information for processing transaction over the Internet. A secure storage device 942 allows the business customer information system 940 to make current billing data available to customers which is accessed by the Internet server 906. These customers may only read the billing data on the secure storage device 942. In this manner, the customers cannot access the customer master database 910. A second secure storage device 944 allows the Internet server 906 to write customer information update data and allows the business customer information system 940 to only read such data. This allows for the most current information to be stored about the customers.

A transaction history and account names file 946 is maintained and updated by customer data taken by the Internet server 906. The information in the file 946 is written by the transaction processing system 902 to a secure storage device 948 so customers may see when bills were actually paid and their historical expenditures. Similarly, a customer transactions file 950 is created by the Internet server 906 for each customer. The Internet server 906 writes this data into a secure storage device 952 which the transaction processing system 902 only reads, thus passing customer instructions back to the transaction processing system 902. The transaction processing system 902 uses the customer instructions and debits and credits the appropriate accounts according to the customer's instructions. By using these methods, a customer's account number has never been placed on the Internet and their account number is inaccessible from the Internet.

The storage device may thus be related to at least five applications: 1) A data storage/transmission device for which data can be written to from one computer and read from a separate computer; 2) A data storage/transmission device for which a "continuous connectivity" connection is physically broken between two computers while maintaining data exchange; 3) A data storage/transmission device where data may be distributed to multiple distributed computers at the same time; 4) A data storage/transmission device which provides computing security in open computing environments, such as the World Wide Web or Internet; and 5) A data storage/transmission device which enables secure Business-to-Business computing.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A secure storage system for protecting data exchanged between a first and second computer both capable of requesting the reading of data and the writing of data, the secure storage system comprising:

an active connector capable of receiving data or sending data, coupled to the first computer;

a passive connector capable of receiving data or sending data, coupled to the second computer;

a disk controller coupled to the passive connector;

a disk electronics unit coupled to the disk controller;

a storage media having stored data written from the first computer capable of processing simultaneous requests from the first and second computers, the storage media coupled to the disk electronics unit and allowing the second computer to read the stored data and ignores any command received from the passive connector to write data on the storage media.

2. The system in claim 1 wherein the active connector has a unique identification address assigned to data it receives and the passive connector has a second unique identification address assigned to data it receives.

3. The system in claim 2 further comprising: a first slot having a unique identification number coupled to the active connector; and a second slot having a unique identification number coupled to the passive connector.

4. The system in claim 3 wherein the disk controller is coupled to the active connector.

5. The system in claim 4 wherein the disk electronics unit includes firmware which controls the reading and writing of data on the storage media wherein the firmware reads data received from the active and passive connectors and the unique identification addresses and the unique identification number of the slots to determine whether to write the received data on the storage media.

6. The system in claim 5 wherein the firmware is installed in the disk electronics after being modified to control the storage media.

7. The system in claim 6 wherein the firmware is programmed with the identification addresses of the active and passive connectors and the unique identification numbers of the first and second slots.

8. The system in claim 4 wherein the disk controller includes firmware which controls the reading and writing of data on the storage media wherein the firmware reads data received from the active and passive connectors and the unique identification addresses and the unique identification number of the slots to determine whether to write the received data on the storage media.

9. The system in claim 8 wherein the firmware is installed in the disk controller after being modified to control the storage media.

10. The system in claim 9 wherein the firmware is programmed with the identification addresses of the active and passive connectors and the unique identification numbers of the first and second slots.

11. The system in claim 3 further comprising:

a second disk controller coupled to the active connector;

a second disk electronics unit coupled to the active connector;

wherein the disk controller and disk electronics unit control the storage media when the second computer requests data to be read or written and wherein the second disk controller and second disk electronics unit control the storage media when the first computer requests data to be read or written.

12. The system in claim 1 wherein the storage media is a hard disk.

13. The system in claim 1 wherein the storage media includes:

a magnetic platter storing data:

a read only head coupled to an actuator arm controlled by the disk electronics which reads data requested by the second computer; and a read/write head coupled to a second actuator arm controlled by the disk electronics which reads data requested by the first computer and writes data received from the first computer.

14. The system in claim 1 wherein the active and passive connections are Ethernet connections.

15. The system in claim 1 wherein the active and passive connections are fiber optics.

16. A method of making data from a first computer available to a second computer while preventing alteration of the data, the method comprising:

establishing an active data connection to the first computer;

establishing a passive data connection for the second computer;

writing data on a storage device from the first computer;

examining requests from the second computer and restricting access to the storage device from the second computer by ignoring all requests for writing data from the second computer to the storage device; and allowing the processing of simultaneous requests to the storage device from the first and second computers.

17. The method in claim 16 further comprising:

assigning a first unique identification address to the passive connector; and assigning a second unique identification address to the active connector.

18. The method in claim 17 further comprising:

reading data received from the first and second computer and assigning the data the first or second unique identification address;

identifying whether the data is from the active and passive connection by the first and second unique identification address; and processing commands in response based on whether the data is from the passive or active connection.

19. The method in claim 17 further comprising:

determining the unique identifier for the active connection;

determining the unique identifier for the passive connection;

modifying firmware for hardware controlling the storage media to store the unique identifiers for the active and passive connection;

modifying firmware to control the storage media to write data having only the unique identifier for the active connection;

loading the modified firmware into the secure storage device.

20. The method in claim 19 wherein the storage device is a hard drive and the firmware is part of a disk controller coupled to a disk electronics unit for controlling the storage device.

21. The method in claim 19 wherein the storage device is a hard drive and the firmware is part of a disk electronics unit which controls the storage device.

22. The method in claim 18 further comprising rejecting data received from the passive connection and sending an error message to the passive connection.

23. The method in claim 16 wherein the passive connection is an Internet connection.

24. The method in claim 16 wherein the passive and active connections are Ethernet connections.

25. The method in claim 21 wherein the passive and active connections are fiber optics.

26. A computing system for the secure exchange of data and prevent data tampering, the system comprising:
- a first computing source having protectable data and an external data conduit;
- a second computing source having an external data conduit; and
- a secure storage device having an active connector coupled to the external data conduit of the first computing source and a passive connector coupled to the external data conduit of the second computing source, the secure storage device including a storage media which stores the protectable data and accepts requests to write the protectable data from the first computing source, allows reading of the protectable data by the second computing source, allows processing simultaneous requests from the first and second computers and ignores requests to write data on the secure storage device from the second computing source.

27. The computing system in claim 26 further comprising a second secure storage device having an active connector coupled to the external data conduit of the second computing source and a passive connector coupled to the external data conduit of the first computing source, the second secure storage device including a storage media which stores the protectable data and accepts writing of the protectable data from the second computing source and only reading of the protectable data by the first computing source.

28. The system of claim 26 wherein the data conduit of the second computing source is an Internet connection.

29. The system of claim 26 further comprising a second secure storage device having an active connector coupled to the external data conduit of the first computing source and a passive connector coupled to the external data conduit of a third computing source, the secure storage device including a second storage media which stores the protectable data and accepts writing of the protectable data from the first computing source and only reading of the protectable data by the third computing source wherein the data on the first secure storage device is private to the owner of the second computing source and the data on the second secure storage device is private to the owner of third computing source.

* * * * *